(12) United States Patent
Kayama et al.

(10) Patent No.: US 8,391,124 B2
(45) Date of Patent: Mar. 5, 2013

(54) OPTICAL DRIVE

(75) Inventors: Hiroshi Kayama, Osaka (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/201,665

(22) PCT Filed: Dec. 17, 2010

(86) PCT No.: PCT/JP2010/007320
§ 371 (c)(1),
(2), (4) Date: Aug. 16, 2011

(87) PCT Pub. No.: WO2011/083536
PCT Pub. Date: Jul. 14, 2011

(65) Prior Publication Data
US 2011/0299372 A1    Dec. 8, 2011

(30) Foreign Application Priority Data
Jan. 8, 2010 (JP) .................................. 2010-002517

(51) Int. Cl.
*G11B 7/00* (2006.01)
(52) U.S. Cl. ............... 369/275.4; 369/47.51; 369/47.21; 369/59.25
(58) Field of Classification Search ............... 369/275.3, 369/275.4, 44.31, 47.5, 116, 53.26, 47.21, 369/44.26, 53.16, 59.25, 47.51, 47.52
See application file for complete search history.

(56) References Cited

U.S. PATENT DOCUMENTS

| | | | |
|---|---|---|---|
| 5,708,653 A | 1/1998 | Okada et al. | |
| 6,278,671 B1* | 8/2001 | Gotoh et al. | 369/47.19 |
| 6,532,208 B2* | 3/2003 | Nakajima | 369/275.4 |
| 2002/0018439 A1* | 2/2002 | Kato et al. | 369/275.4 |
| 2002/0051414 A1* | 5/2002 | Kuribayashi | 369/53.24 |
| 2003/0054128 A1* | 3/2003 | Sako et al. | 428/64.4 |
| 2004/0027980 A1* | 2/2004 | Sako et al. | 369/272 |
| 2004/0047252 A1* | 3/2004 | Miyatake et al. | 369/47.12 |
| 2004/0196779 A1 | 10/2004 | Aratani et al. | |
| 2005/0128905 A1 | 6/2005 | Sako et al. | |

(Continued)

FOREIGN PATENT DOCUMENTS

| | | |
|---|---|---|
| JP | 9-106546 A | 4/1997 |
| JP | 2003-317318 A | 11/2003 |

(Continued)

OTHER PUBLICATIONS

Office Action for related U.S. Appl. No. 12/983,963 mailed Feb. 6, 2012.

(Continued)

*Primary Examiner* — Thomas Alunkal
(74) *Attorney, Agent, or Firm* — Renner, Otto, Boisselle & Sklar, LLP

(57) ABSTRACT

An optical drive according to the present invention can write information on an optical disc, which includes a substrate on which a number of pre-pits (2) have been formed on its tracks (t1 to t8) and a recording film that is supported on the substrate. The optical drive includes an optical pickup, and a writing control section for controlling the optical pickup so that marks (3a, 3b) are recorded on the tracks (t1 to t8) so as to overlap with some of the pre-pits (2) and for making the optical pickup irradiate the recording film with a writing light beam. The recorded marks (3a, 3b) overlap with at least ten of the pre-pits (2).

4 Claims, 22 Drawing Sheets

U.S. PATENT DOCUMENTS

| | | | |
|---|---|---|---|
| 2005/0286400 A1* | 12/2005 | Nishiwaki et al. | 369/275.4 |
| 2006/0002285 A1 | 1/2006 | Olson et al. | |
| 2006/0164965 A1 | 7/2006 | Matsuda et al. | |
| 2011/0007616 A1* | 1/2011 | Yamaoka et al. | 369/47.51 |

FOREIGN PATENT DOCUMENTS

| | | |
|---|---|---|
| JP | 4211395 B | 11/2008 |
| JP | 2010-186543 A | 8/2010 |
| WO | 02/39434 A1 | 5/2002 |
| WO | 03/017274 A1 | 2/2003 |

OTHER PUBLICATIONS

International Search Report for corresponding International Application No. PCT/JP2010/007320 mailed Mar. 22, 2011.
Form PCT/ISA/237 and Partial English translation for corresponding International Application No. PCT/JP2010/007320 dated Mar. 22, 2011.
Co-pending U.S. Appl. No. 12/983,963, filed Jan. 4, 2011.
Co-pending U.S. Appl. No. 12/984,715, filed Jan. 5, 2011.
Co-pending U.S. Appl. No. 12/984,721, filed Jan. 5, 2011.

* cited by examiner

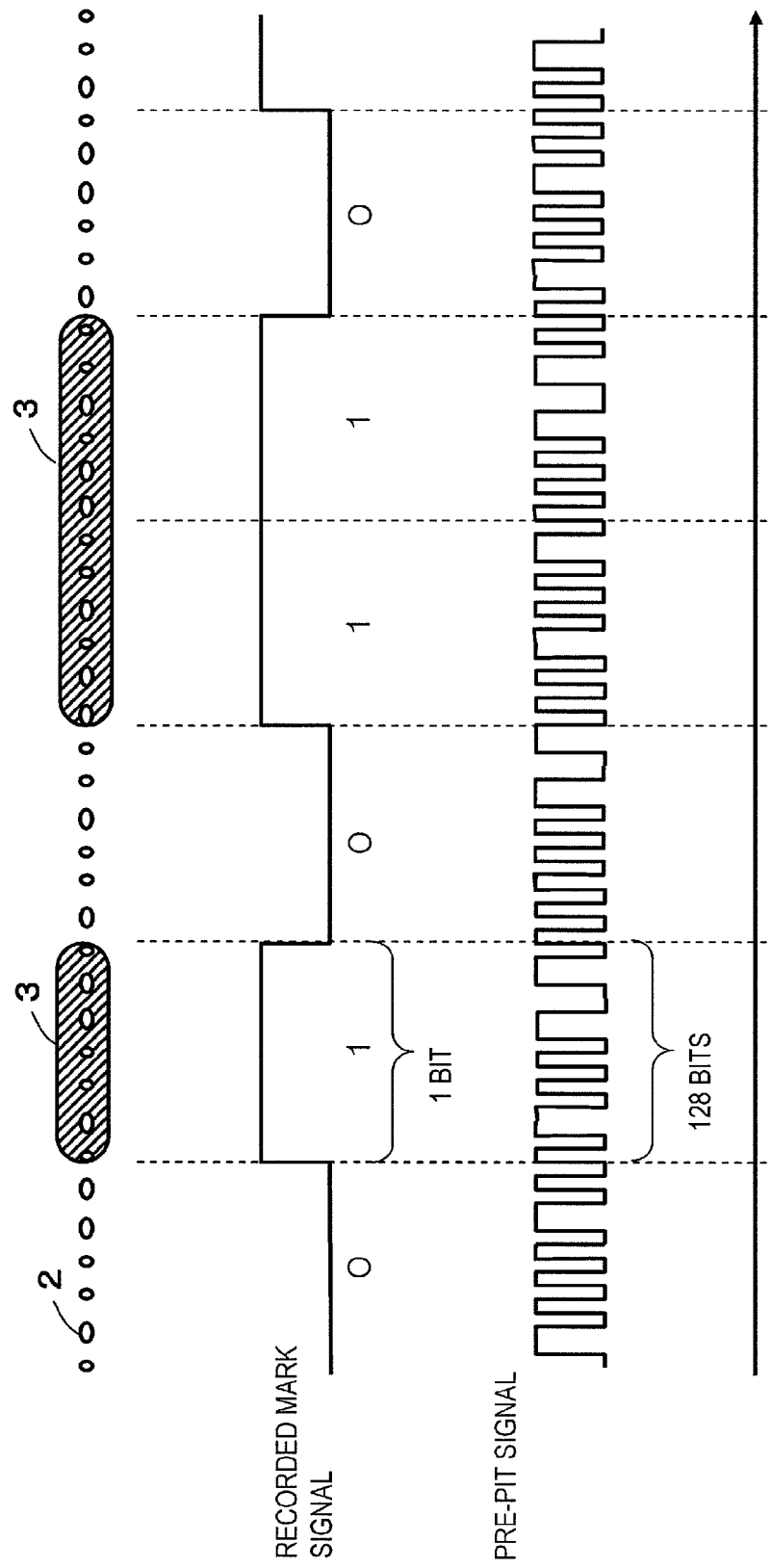

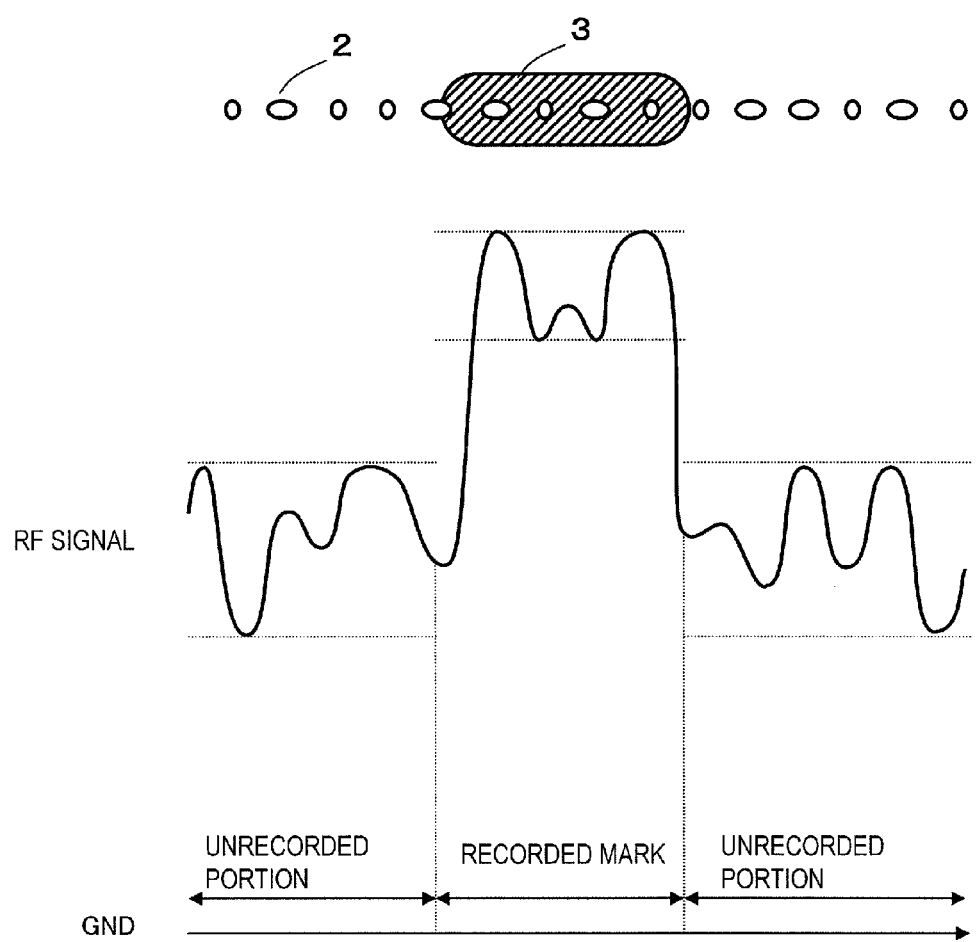

FIG.16

| RECORDING POWER | NUMBER OF WRITE-PROHIBITED TRACKS TO INTERPOSE |
|---|---|
| 1mW | 0 |
| 2mW | 1 |
| 3mW | 2 |
| 4mW | 3 |
| 5mW | 4 |
| | |
| | |

OPTICAL DRIVE

TECHNICAL FIELD

The present invention relates to an optical drive that can write information on an optical disc.

BACKGROUND ART

In optical disc technologies, data can be read out from a rotating optical disc by irradiating the disc with a relatively weak light beam with a constant intensity and detecting the light that has been modulated by, and reflected from, the optical disc. On a read-only optical disc, information is already stored as pre-pits that are arranged either concentrically or spirally during the manufacturing process of the optical disc. On the other hand, on a rewritable optical disc, a recording material film, from/on which data can be read and written optically, is deposited by evaporation process, for example, on the surface of a substrate on which concentric or spiral grooves are arranged. In writing data on a rewritable optical disc, data is written there by irradiating the optical disc with a pulsed light beam, of which the optical power has been changed according to the data to be written, and locally changing the property of the recording material film.

In a recordable or rewritable optical disc, when data is going to be written on its recording material film, the recording material film is irradiated with such a light beam, of which the optical power has been modulated as described above, thereby recording an amorphous mark on a crystalline recording material film. Such an amorphous recorded mark is left there by heating a portion of the recording material film that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will go crystalline again after having been cooled rapidly (i.e., the recorded mark will be erased). In this manner, the recorded mark can be rewritten over and over again. However, if the optical power of the light beam for writing data (i.e., optical recording power) had an inappropriate level, then the recorded mark would have a deformed shape and sometimes it could be difficult to read the data as intended.

To read data that is stored on an optical disc or to write data on a rewritable optical disc, the light beam always needs to maintain a predetermined converging state on a target track. For that purpose, a "focus control" and a "tracking control" need to be done. The "focus control" means controlling the position of an objective lens along a normal to the surface of the optical disc (such a direction will sometimes be referred to herein as "optical disc depth direction") so that the focal point (or at least the point of convergence) of the light beam is always located on the target track. On the other hand, the "tracking control" means controlling the position of the objective lens along the radius of a given optical disc (which direction will be referred to herein as a "disc radial direction") so that the light beam spot is always located right on the target track.

In order to perform such a focus control or a tracking control, the focus error or the tracking error needs to be detected based on the light that has been reflected from the optical disc and the position of the light beam spot needs to be adjusted so as to reduce the error as much as possible. The magnitudes of the focus error and the tracking error are respectively represented by a "focus error (FE) signal" and a "tracking error (TE) signal", both of which are generated based on the light that has been reflected from the optical disc.

Patent Documents Nos. 1 and 2 disclose an optical disc including a read-only memory (ROM) layer on which pre-pits have already been formed and a rewritable layer on which marks will be recorded. In the optical discs disclosed in these documents, when measured from the surface of the disc (i.e., the light incident surface), those layers are located at quite different depths. That is why in reading data from the ROM layer, the light beam needs to be focused on the ROM layer. On the other hand, in reading or writing data from/on the rewritable layer, the light beam needs to be focused on that rewritable layer.

Patent Documents Nos. 3 and 4 disclose a technique for recording marks on a layer of an optical disc on which pre-pits have already been formed.

CITATION LIST

Patent Literature

Patent Document No. 1: Japanese Patent Application Laid-Open Publication No. 9-106546
Patent Document No. 2: Japanese Patent Application Laid-Open Publication No. 2010-186543
Patent Document No. 3: PCT International Application Publication No. 2002/039434
Patent Document No. 4: Japanese Patent Application Laid-Open Publication No. 2003-317318

SUMMARY OF INVENTION

Technical Problem

Generally speaking, pre-pits are formed as integral parts of the physical structure of an optical disc when the optical disc is made. On the other hand, marks are usually recorded by irradiating an optical disc with a light beam in an optical drive and causing an optical structural change in the recording material film of the optical disc. That is to say, pre-pits and recorded marks are formed by totally different methods.

According to the techniques disclosed in Patent Documents Nos. 1 and 2, data should be read from the ROM layer and the rewritable layer separately, and therefore, focus and tracking controls need to be done on those two layers independently of each other. It is also necessary to generate one of two different kinds of tracking error (TE) signals depending on whether the light beam spot is currently located on the ROM layer or the rewritable layer. Since tracking guide grooves should be made on the rewritable layer, the structure of the optical disc is too complicated to make easily.

Meanwhile, according to the technique disclosed in Patent Document No. 3, a difference in light intensity in its polarization direction is detected (with attention paid to its magnetic anisotropy) as a method for separating pre-pit signals from recorded mark signals. In that case, however, an optical system for detecting the difference in the polarization direction is required, thus making the structure of the optical pickup overly complicated.

And according to the technique disclosed in Patent Document No. 4, a write-once operation is performed by irradiating a portion of a reflective film on the plane where pre-pits are arranged with intense light. To read the information that has been added through such a write-once operation, a subtle variation in reflectance should be detected (see, in particular, Paragraph #0038 and FIG. 6 of Patent Document No. 4).

However, since such a portion, of which the reflectance has varied slightly as a result of the write-once operation, is shorter than a pre-pit, it is difficult to read the added information appropriately.

It is therefore an object of the present invention to provide an optical drive that can record a mark on an optical disc on which pre-pits have already been formed even if the optical disc has a simplified structure.

Solution to Problem

An optical drive according to the present invention can write information on an optical disc, which includes a substrate on which a number of pre-pits have been formed on its tracks and a recording film that is supported on the substrate. The optical drive includes an optical pickup, and a writing control section that controls the optical pickup so that marks are recorded on the tracks so as to overlap with some of the pre-pits. The writing control section makes the optical pickup irradiate the recording film with a writing light beam. The recorded marks overlap with at least ten of the pre-pits.

In one preferred embodiment, the writing control section makes the optical pickup irradiate the recording film with the writing light beam continuously while the marks are being recorded.

In another preferred embodiment, the optical drive includes a tracking control section for performing a tracking control based on the information that is provided by the pre-pits and that is included in a signal representing reflected light that has been detected by the optical pickup.

In this particular preferred embodiment, while the marks are being recorded, the tracking control section performs the tracking control based on the information that is provided by the pre-pits and that is included in the signal representing the reflected light that has been detected by the optical pickup.

In an alternative preferred embodiment, before the marks are recorded, the tracking control section performs the tracking control, which otherwise needs to be done while the marks are being recorded, based on the information that is provided by the pre-pits and that is included in the signal representing the reflected light that has been detected by the optical pickup.

In still another preferred embodiment, the optical drive further includes a reading control section for making the optical pickup retrieve information from the optical disc on which marks have been recorded by the writing control section so as to overlap with some of the pre-pits. By reference to the jitter of a signal representing reflected light that has been detected by the optical pickup, the reading control section senses where the marks have been recorded by the writing control section.

In yet another preferred embodiment, the optical drive further includes a reading control section that makes the optical pickup retrieve information from the optical disc on which marks have been recorded by the writing control section so as to overlap with some of the pre-pits. By reference to the amplitude of a signal representing reflected light that has been detected by the optical pickup, the reading control section senses where the marks have been recorded by the writing control section.

In an alternative preferred embodiment, the optical drive further includes a reading control section that makes the optical pickup retrieve information from the optical disc on which marks have been recorded by the writing control section so as to overlap with some of the pre-pits. By reference to the frequency of a signal representing reflected light that has been detected by the optical pickup, the reading control section distinguishes the information provided by the pre-pits from information represented by the recorded marks.

In yet another preferred embodiment, when recording the marks, the writing control section controls the power of the writing light beam so as to prevent the pre-pits that are overlapped by the recorded marks from being too deformed to retrieve information from any longer.

In yet another preferred embodiment, as viewed from the recording film, the pre-pits of the optical disc are dented.

In this particular preferred embodiment, when recording the marks, the writing control section controls the power of the writing light beam so that reflectance varies just locally in portions of the recording film that are located over the dented pre-pits.

In an alternative preferred embodiment, when recording the marks, the writing control section controls the power of the writing light beam so that portions that are located over the dented pre-pits are deformed locally.

Another optical drive according to the present invention can also write information on an optical disc, which includes a substrate on which a number of pre-pits have been formed on its tracks and a recording film that is supported on the substrate. The optical drive includes an optical pickup, and a writing control section that controls the optical pickup so that marks are recorded on the tracks so as to overlap with some of the pre-pits. The writing control section makes the optical pickup irradiate the recording film with a writing light beam. The writing control section controls the power of the writing light beam so that reflectance varies just locally in portions of the recording film that are located over dented pre-pits. And each recorded mark is made up of multiple portions with locally varied reflectances.

Still another optical drive according to the present invention can also write information on an optical disc, which includes a substrate on which a number of pre-pits have been formed on its tracks and a recording film that is supported on the substrate. The optical drive includes an optical pickup, and a writing control section for controlling the optical pickup so that marks are recorded on the tracks so as to overlap with some of the pre-pits. The writing control section makes the optical pickup irradiate the recording film with a writing light beam. The writing control section controls the power of the writing light beam so that portions of the recording film that are located over the dented pre-pits are deformed locally. Each recorded mark is made up of multiple portions that have been locally deformed.

In one preferred embodiment, each recorded mark is made up of ten or more portions with locally varied reflectances.

Advantageous Effects of Invention

According to the present invention, even when a mark needs to be recorded on an optical disc on which pre-pits have already been formed, the optical disc can still have a simplified structure.

BRIEF DESCRIPTION OF DRAWINGS

FIG. 5 shows bit sequences representing pre-pits and recorded marks according to the first preferred embodiment.

FIG. 8A shows how the waveform of an RF signal changes according to the first preferred embodiment while a mark is being recorded.

FIG. 16 is a table summarizing the relations between the recording power and the number of write-prohibited tracks to interpose.

DESCRIPTION OF EMBODIMENTS

Embodiment 1

Hereinafter, preferred embodiments of an optical drive according to the present invention will be described.

1. Configuration of the First Preferred Embodiment 1.1. Optical Disc Drive's Arrangement (FIG. 1)

First of all, an exemplary arrangement for an optical drive 500 as a first preferred embodiment of the present invention will be described with reference to FIG. 1. The optical drive 500 may be used in personal computers, optical disc players, optical disc recorders and other devices that use an optical disc.

Figure 1:
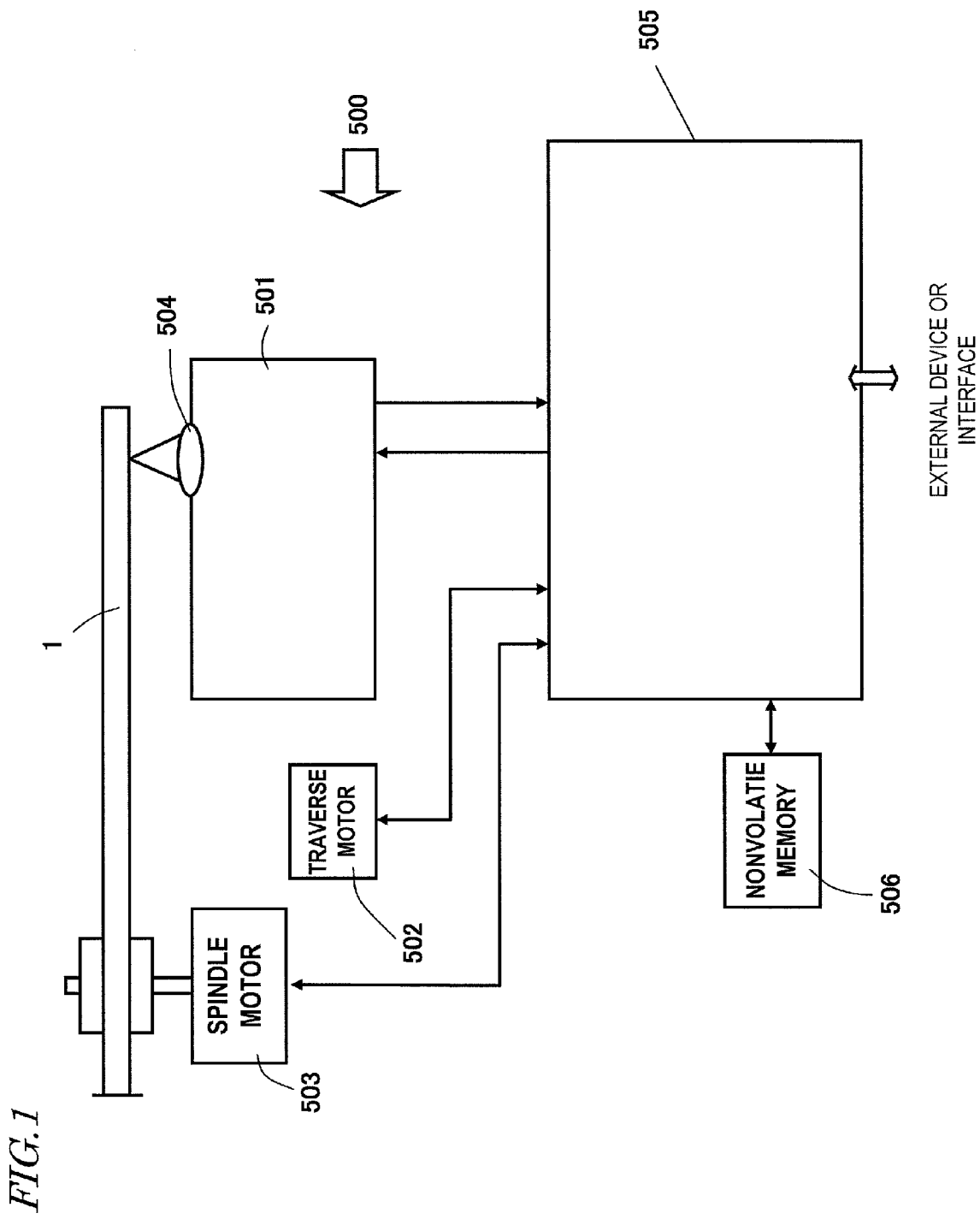
FIG. 1 is a diagram illustrating an exemplary arrangement for an optical drive according to a first preferred embodiment of the present invention.

FIG. 1 is a block diagram illustrating an exemplary arrangement for the optical drive 500. The optical drive 500 includes an optical pickup 501, a spindle motor 503 for rotating a given optical disc 1, a traverse motor 502 for controlling the position of the optical pickup 501, a system controller 505 for controlling the operations of all of these components, and a nonvolatile memory 506.

Data is optically read out from the optical disc 1, and photoelectrically converted by the photodetector (not shown) of the optical pickup 501 into an electrical signal, which is then passed to the system controller 505. The optical pickup 501 includes a light source (such as a semiconductor laser diode) for emitting a light beam, an objective lens 504 for condensing the light beam and forming a light beam spot on the optical disc 1, an actuator for driving the objective lens 504, and other known members.

Based on the electrical signal provided by the optical pickup 501, the system controller 505 generates servo signals including a focus error (FE) signal and a tracking error (TE) signal, and performs various kinds of analog signal processing such as waveform equalization on the read signal, binarization/slicing, and data synchronization.

By using those servo signals generated, the system controller 505 makes the light beam spot, which is formed by the optical pickup 501 on the optical disc 1, follow the target track on the rotating optical disc 1. The system controller 505 gets a series of control operations, including focus and tracking controls using the objective lens 504 of the optical pickup 501, an optical pickup transport control, and a control of the spindle motor, done as digital servo operations. That is to say, the system controller 505 contributes to driving appropriately the actuator (not shown) of the objective lens 504, the traverse motor 502 that moves the optical pickup 501 either inward or outward with respect to the optical disc 1, and the spindle motor 503 that rotates the optical disc 1. It should be noted that the system controller 505 could be implemented as a semiconductor IC.

The nonvolatile memory 506 stores a software program to be executed by the system controller 505, various parameters, and other sorts of information, which include location information indicating exactly where on the optical disc 1 marks 3 should be recorded.

1.2. Optical Disc's Structure (FIGS. 2, 3 and 4)

Next, the structure of the optical disc 1 will be described with reference to FIGS. 2, 3 and 4.

Figure 2:
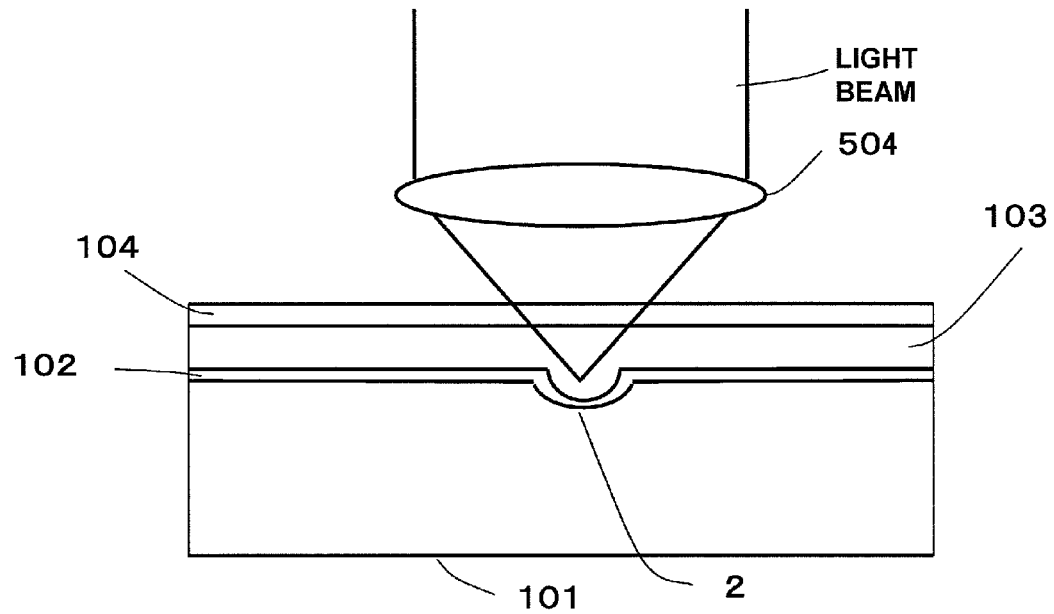
FIG. 2 is a cross-sectional view of an optical disc according to the first preferred embodiment.
Figure 3:
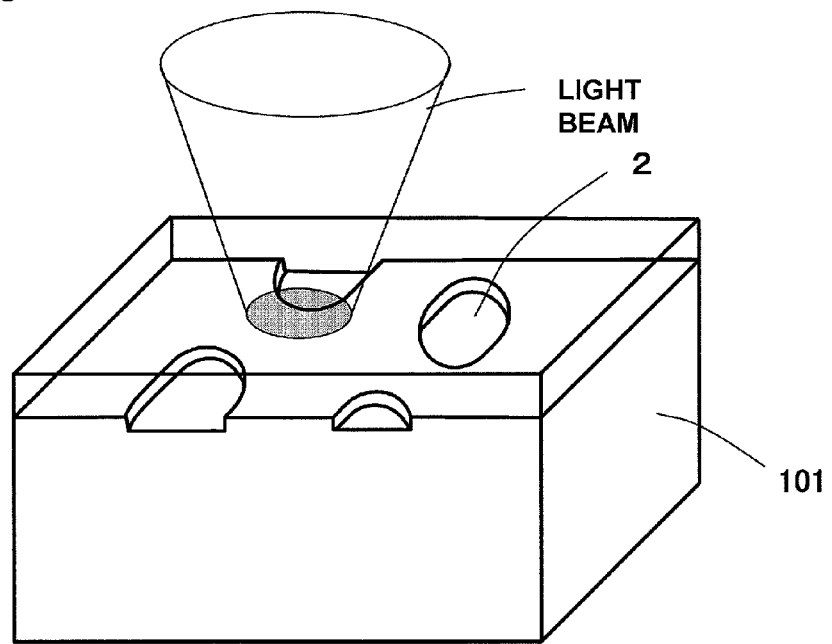
FIG. 3 is a perspective view illustrating some pre-pits of the optical disc according to the first preferred embodiment.

FIG. 2 schematically illustrates a part of a cross section of the optical disc 1. The optical disc 1 includes a substrate 101, of which the principal surface has a pre-pit 2, and a multilayer structure, which is supported on the principal surface of the substrate 101. The multilayer structure of this preferred embodiment includes a recording film 102, a protective film 103, and a hard coating 104, which are stacked in this order on the substrate 101.

In writing data on the optical disc 1 by performing a write-once operation, the optical drive 500 shown in FIG. 1 irradiates the recording film 102 with a light beam, which has been emitted by the optical pickup 501 and then transmitted through the hard coating 104, thereby recording a mark 3 on the recording film 102.

The substrate 101 forms the supporting base of the optical disc 1. Although only one pre-pit 2 is illustrated in FIG. 2, a huge number of pre-pits 2 are actually formed on the principal surface of the substrate 101, on which the recording film 102 is deposited. Those pre-pits 2 are physical dents or projections on the principal surface of the substrate 101 and are made in the process step of forming the substrate 101 during the manufacturing process of the optical disc 1. Such a substrate 101 having those pre-pits 2 on its surface may be formed by a known process for manufacturing a BD-ROM.

If the wavelength of the light beam to emit is represented by $\lambda$, the depth of the pre-pits 2 may fall within the range of $\lambda/7$ through $\lambda/4$. For example, if $\lambda \approx 405$ nm, the pre-pits 2 typically have a depth of approximately 60-100 nm (=approximately 0.06 µm through 0.1 µm). The length of the pre-pits 2 as measured in the tracking direction may be from one through several times as long as 0.15 µm.

As shown in FIG. 3, the pre-pits 2 that have been made on the optical disc 1 of this preferred embodiment are "in-pits", which are depressed with respect to the light incident surface. Conversely, "on-pits" are raised with respect to the light incident surface. Although the pre-pits 2 are dents on the light incident surface of the substrate 101 in the example illustrated in FIGS. 2 and 3, pre-pits 2 may also be projections in another example.

The substrate 101 may be made of polycarbonate, for example. The pre-pits 2 are arranged either concentrically or spirally to form tracks. In other words, a chain of pre-pits 2 has been formed on the tracks. By forming those pre-pits 2, non-rewritable data is recorded on the substrate 101 as early as in its manufacturing process. The principal surface of the substrate 101 with those pre-pits 2 functions as a read-only information storage plane (which will be referred to herein as a "ROM plane"). The optical disc 1 for use in this preferred embodiment also has a recording film 102, which contacts with the ROM plane.

When the optical disc drive shown in FIG. 1 starts to operate by being loaded with the optical disc 1, the recording film 102 is irradiated with the light beam that has been emitted from the optical pickup 501. Specifically, the light beam is condensed by the objective lens 504 onto the recording film 102, thereby forming a light beam spot on the recording film 102. As the optical disc 1 rotates, the light beam spot moves on the optical disc in its rotating direction. When information is added to the recording film 102 through a write-once operation, the recording film 102 is irradiated with sufficiently intense light. As a result, that irradiated portion of the recording film 102 has its optical properties changed in terms of reflectance, transmittance and phase difference, for example.

A portion of the recording film 102, of which the optical properties have changed due to the exposure to the writing light beam, will serve as a recorded mark 3. By recording a number of marks 3 along the tracks, information can be written on (i.e., data can be added to) the recording film 102. A portion of one track that is located between two adjacent recorded marks 3 on the same track will be referred to herein as a "space". The overall arrangement of the recorded marks 3 and the spaces with various lengths is determined by what kind of information is going to be written. In other words, each of those recorded marks 3 has a length that is selected from a number of different lengths. If a track with the recorded marks 3 and spaces is scanned with a scanning light beam, the intensity of the reflected light (which will be referred to herein as a "reading light beam") varies between the recorded marks 3 and the spaces. And by detecting the intensity of the reading light beam, the information that has been written on the recording film 102 (i.e., the added information) can be read out. Since the intensity of the reading light beam will vary at radio frequencies, the read signal is often called an "RF signal".

When the information added to the recording film 102 is read, the recording film 102 is irradiated with a relatively weak light beam that has been emitted from the optical pickup. The recording film 102 that can be used effectively in this preferred embodiment can reflect that weak light even if the recording film 102 has no special reflective layer. That is to say, the recording film 102 functions as not just a recording film but also a reflective film as well. The recording film 102 may be made of a phase change material such as Ge, Sb, Te, In or Ag. With the recording film 102 of such a phase change material, the recorded marks can be rewritten. Alternatively, the recording film 102 may also be made of an inorganic or organic material such as Te, Pd, O, Cu, Ge, Bi or N. Once recorded on a recording film 102 made of such a material, a mark is no longer rewritable. Still alternatively, the recording film 102 may also be a metallic film of Al or Ag, for example. If such a metallic film is irradiated with intense light, holes can be cut through the metallic film. And those holes correspond to the recorded marks.

The protective film 103 protects the recording film 102 and may be made of a resin material, for example. The hard coating 104 is provided to reduce scratches or dirt that would otherwise do damage on the recording film 102 or the protective film 103 externally, and may be made of $SiO_2$ particles and a lubricant, for instance.

In this preferred embodiment, the recording film 102 does contact with the surface of the substrate 101 with the pre-pits 2 (i.e., the principal surface). However, another film or layer may be interposed between the principal surface of the substrate 101 and the recording film 102. In any case, however, the optical disc 1 is preferably designed so that the reflected light produced when the light beam emitted from the optical pickup is focused on the recording film 102 has its intensity changed depending on whether there is a pre-pit 2 there or not. The point is that in a preferred embodiment of the present invention, when information is written as a recorded mark 3 on the recording film 102 or when information is retrieved from the mark 3 that has been recorded on the recording film 102, the tracking error signal should be generated using the pre-pits 2. For that reason, such a film or layer to be interposed, if any, between the principal surface of the substrate 101 and the recording film 102 preferably has a thickness of at most 0.5 µm.

According to this preferred embodiment, both the tracking control to get done when information is retrieved from the pre-pits 2 of the optical disc 1 and the tracking control to get done when information is written as a recorded mark 3 onto the optical disc 1 and when information is read from the recorded mark 3 on the optical disc 1 can be carried out using the same tracking error signal. As a result, a tracking error signal generating section for generating the tracking error signal can have its configuration significantly simplified. Specifically, since the tracking error signal generating section can be implemented as a single quadruple photodetector, the optical pickup can be made at a reduced cost according to this preferred embodiment, which is beneficial.

Next, it will be described with reference to FIGS. 4A and 4B how the optical disc 1 changes before and after the marks 3 are recorded thereon.

Figure 4A:
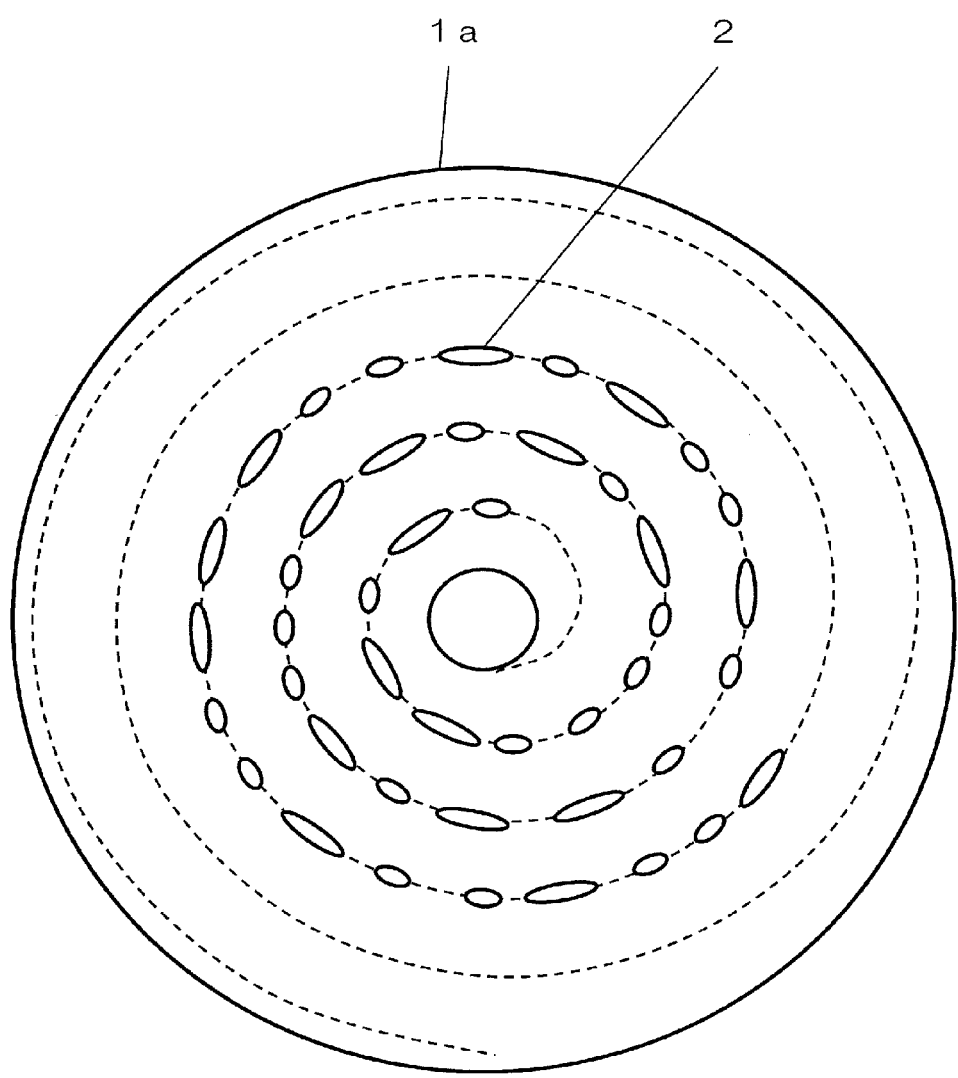
FIG. 4A is a plan view illustrating one status of the optical disc of the first preferred embodiment on which no marks 3 have been recorded yet.
Figure 4B:
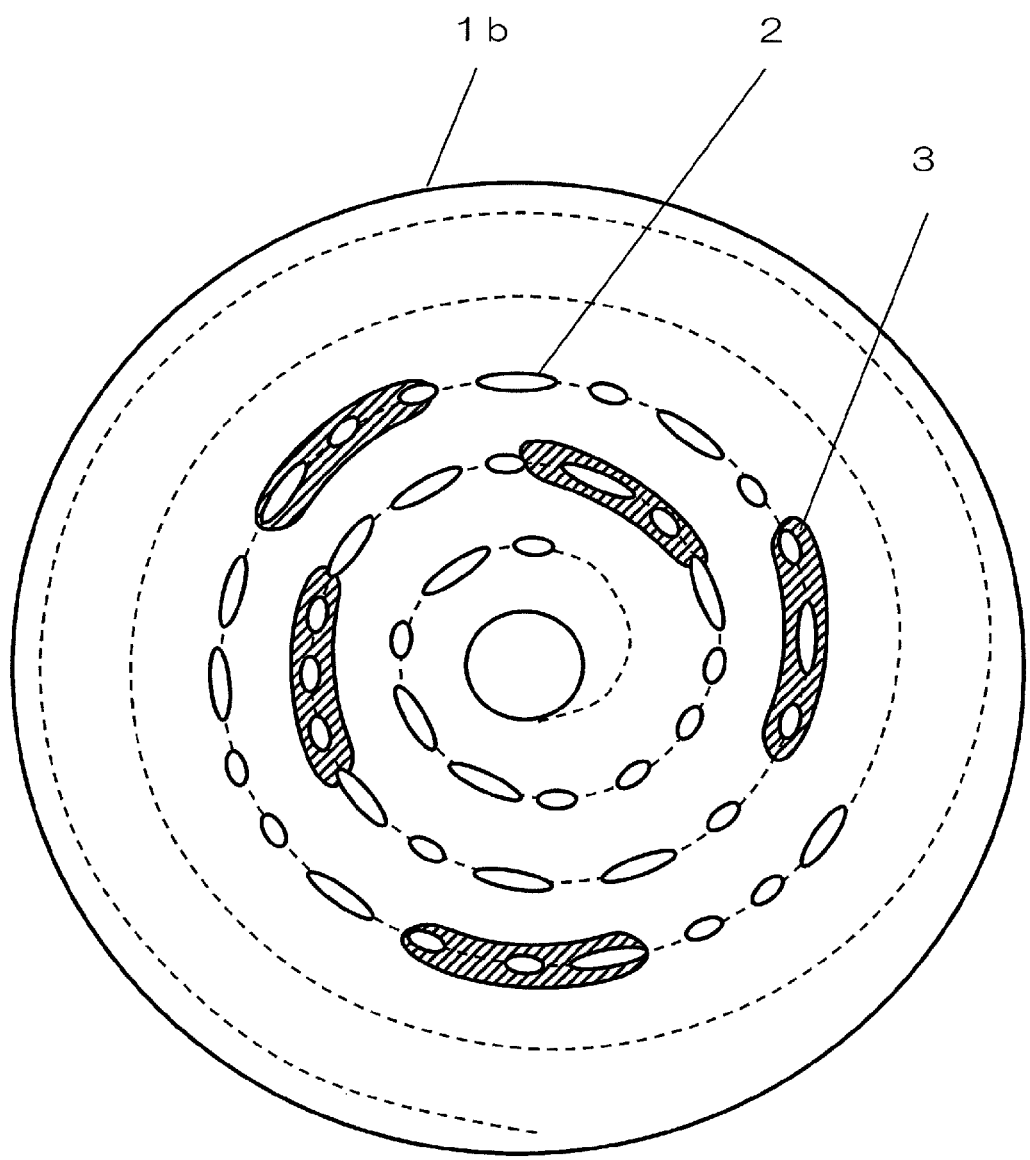
FIG. 4B is a plan view illustrating another status of the optical disc of the first preferred embodiment on which marks 3 have already been recorded.

FIG. 4A is a plan view illustrating the status of the optical disc 1a on which no marks 3 have been recorded yet. On this optical disc 1a, a concentric or spiral chain of pre-pits 2 has already been cut on the substrate 101 from its inner edge through its outer edge. FIG. 4B is a plan view illustrating how the optical disc 1b looks after marks 3 have been recorded thereon. In this optical disc 1b, the marks 3 have been recorded on the recording film 102 so as to overlap with the pre-pits 2. The lengths of the recorded marks 3 as measured along the tracks are defined so that each of those recorded marks 3 overlaps with at least ten pre-pits 2. In the example illustrated in FIG. 4B, each of these recorded marks 3 overlaps with only three pre-pits that are arranged in line on the same track. Actually, however, each recorded mark always overlaps with more than ten pre-pits 2. The length of each recorded mark is at least 10 times, and preferably 50 or more times, as long as the shortest length of the pre-pits. For example, if the pre-pits 2 represent data that has been modulated by 1-7 modulation and if the length of one channel clock period is represented by T, the pre-pits 2 have a minimum length of 2T and a maximum length of 8T. On the other hand, the lengths of the recorded marks 3 are set to be 80T or more. Even after the marks 3 have been recorded, the pre-pits can still be scanned by the optical drive 500 for the reasons to be described later.

2. How Optical Drive Works 2.1. Writing Control by System Controller 505

Hereinafter, it will be described how the system controller 505 performs a writing control when recording marks 3. In the following description, the controls to be performed by the system controller 505 before and during writing will be described. On receiving an instruction from an external device, the system controller 505 operates so as to record a mark on the optical disc.

2.1.1. Control to Perform Before Writing

First of all, the system controller 505 determines what marks 3 should be recorded on the optical disc 1. In this preferred embodiment, one-bit recording length of the recorded marks 3 has been defined and stored in advance in the nonvolatile memory 506. One-bit recording length of the recorded marks 3 is determined so that each recorded mark becomes longer than any of the pre-pits 2 that have already been formed on the optical disc 1 as described above. For example, after a huge number of pre-pits 2 have been cut to represent data of 128 bits, a mark 3 of one bit may be recorded to cover all of those pre-pits 2 as shown in FIG. 5, in which shown along with the signal waveforms is a schematic representation of the pre-pits 2 and the recorded marks 3. It should be noted that in this schematic representation, the locations of the pre-pits 2 are shown just roughly and do not exactly correspond to the waveform of the pre-pit signal shown in FIG. 5.

In the example illustrated in FIG. 5, a portion with a recorded mark 3 represents a "1" bit, while a portion with no recorded marks 3 represents a "0" bit. The lengths of the recorded marks 3, each representing one bit, are typically equal to each other on the same track. For example, if two "1" bits appear consecutively in a portion, then that portion can be regarded as having a length of two bits and consisting of a series of two recorded marks 3. On the other hand, the lengths of the pre-pits 2 have been modulated according to the kind of information to represent as in a BD-ROM, and therefore, are not constant.

The correspondence between the length of one recorded mark 3 (i.e., one-bit recording length of the data added) and the number of bits of the ROM data that are provided by those pre-pits 2 is stored in advance in the nonvolatile memory 506 shown in FIG. 1. In this preferred embodiment, one-bit recording length of the added data corresponds to the combined length of 128 bits of the ROM data. However, this is just an example and the present invention is in no way limited to that specific preferred embodiment. Anyway, since an RF signal in which the added data and the ROM data are superposed one upon the other is read from the optical disc of the present invention as will be described later, these two types of data that are included in the same RF signal should have frequencies that are different from each other by at least one digit so as to be easily distinguished from each other.

The system controller 505 determines the lengths of the recorded marks 3 by the one-bit recording length of the recorded marks 3 that is stored in the nonvolatile memory 506, thereby generating a control signal for use to record marks 3 on the optical disc 1.

Figure 6A:
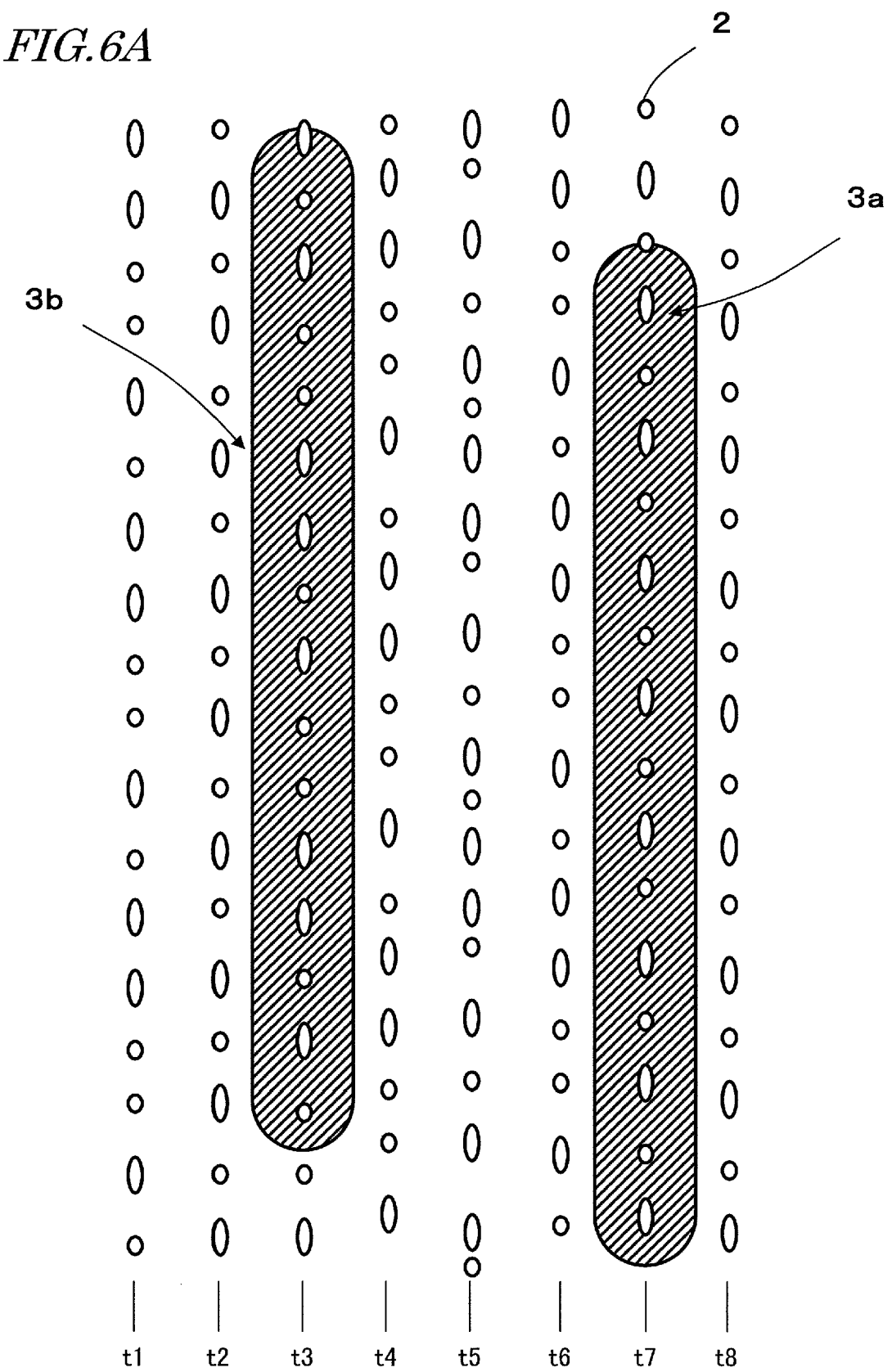
FIG. 6A shows where marks may be recorded on an optical disc according to the first preferred embodiment.
Figure 6B:
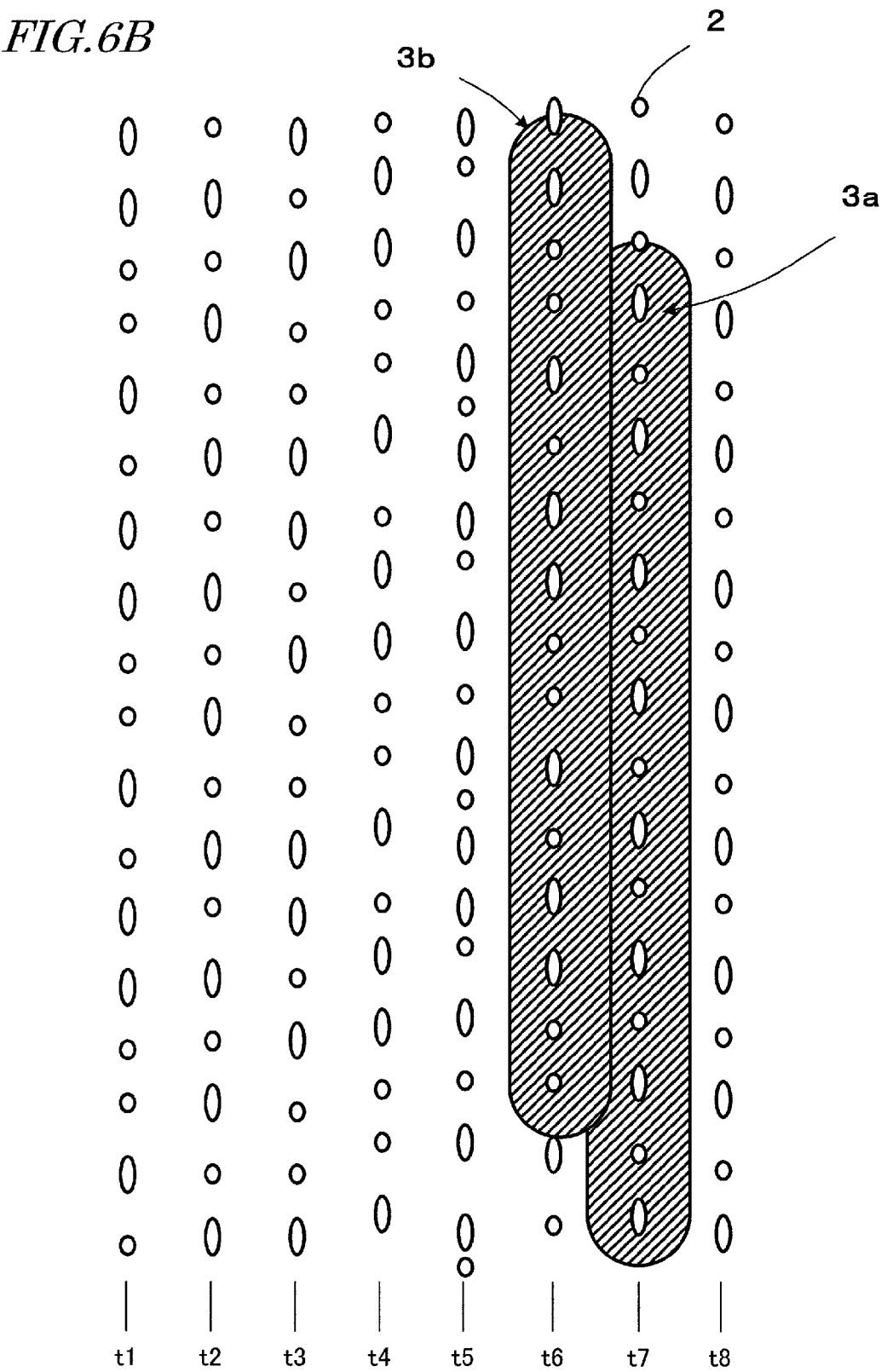
FIG. 6B shows where marks may be recorded on an optical disc as a comparative example.

Next, it will be described with reference to FIGS. 6A and 6B where the marks 3 are recorded. Specifically, FIG. 6A illustrates where the marks 3 may be recorded in a preferred embodiment of the present invention, while FIG. 6B illustrates where the marks 3 may be recorded in a comparative example.

According to this preferred embodiment, the system controller 505 adjusts the locations of the marks 3 to record in order to prevent a mark 3 that has been recorded on one track from affecting any other mark 3 that has been recorded on an adjacent track. In the example illustrated in FIG. 6A, a first mark 3a has been recorded on a track t7 and a second mark 3b has been recorded on a track t3. On the other hand, in the comparative example shown in FIG. 6B, the second mark 3b has been recorded on a track t6, not on the track t3. In the latter case, when the added information is retrieved from the first recorded mark 3a on the track t7, the first recorded mark 3a should be affected by the second recorded mark 3b on the adjacent track t6. As a result, the first recorded mark 3a may be detected erroneously from the area where the first recorded mark 3a does not actually exist.

The optical disc for use in this preferred embodiment has no guide grooves and has such long recorded marks 3 that the heat generated by irradiating the disc with a light beam easily diffuses along the radius of the optical disc (i.e., perpendicularly to the tracks). In particular, according to this preferred embodiment, each mark 3 is recorded by emitting a single continuous light beam with long duration, not in multiple pulses with short widths, from the light source. That is why the width of each recorded mark 3 tends to be approximately equal to, or even greater than, one track pitch. The higher the optical power of the light beam to emit to record a mark, the wider the resultant recorded mark 3 tends to be. In a preferred embodiment of the present invention, the interval between the respective centerlines of two recorded marks 3 that are adjacent to each other along the radius of the optical disc is set to be at least equal to two track pitches. This interval may be either varied according to the optical power of the light beam or fixed at a sufficiently large value. Alternatively, tracks to have recorded marks 3 and tracks to have no recorded marks 3 may be determined in advance and at least one track with no recorded marks 3 may always be interposed between two tracks with recorded marks 3.

Figure 6C:
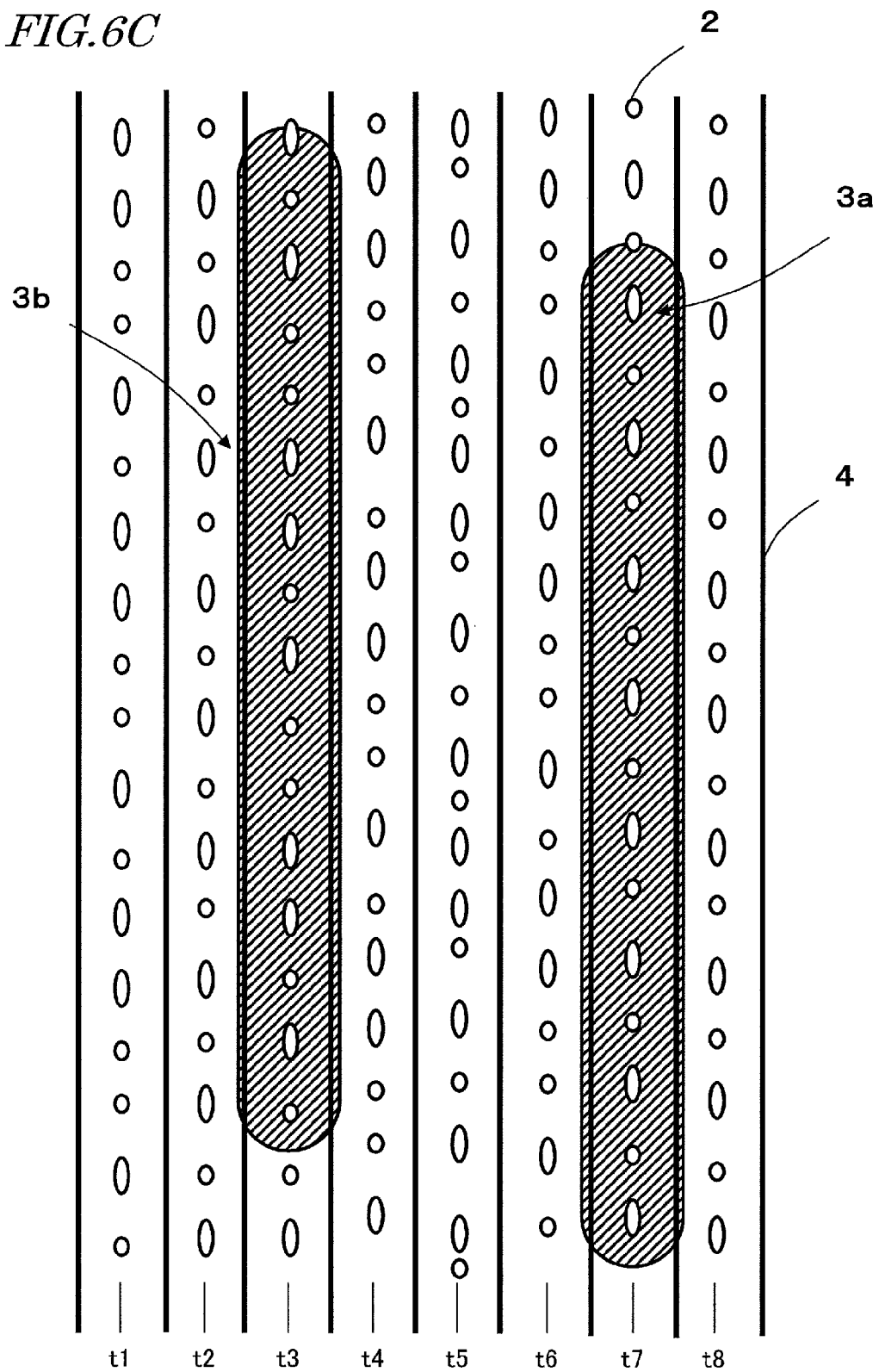
FIG. 6C shows where marks may be recorded on an optical disc with grooves.

FIG. 6C illustrates where marks are recorded on an optical disc that has grooves between pre-pits. If the tracking control is carried out using a tracking error signal (preferably, a DPD signal) obtained from the pre-pits, then no guide grooves are needed for tracking purposes. However, a groove arranged between the tracks would prevent the heat generated from diffusing, and therefore, an unintentional increase in the width of a recorded mark can be avoided. For that reason, a groove may be cut between the tracks. But the depth of the grooves has nothing to do with generation of the tracking error signal and may be determined arbitrarily.

In this description, a track on which marks 3 may be recorded will be referred to herein as a "write-permitted track", while a track on which no marks may be recorded will be referred to herein as a "write-prohibited track". If only one write-prohibited track is interposed between two write-permitted tracks, then two recorded marks that are located on those two write-permitted tracks and that are adjacent to each other along the radius of the optical disc have a centerline interval of at least two track pitches.

The optical power of the light beam to be emitted to record a mark on the optical disc that has been loaded into this optical drive may be optimized to a different value according to the type of that disc. That is why the width of the recorded marks 3 is variable according to the type of the optical disc that has been loaded into the optical drive.

After the optical drive has been loaded with the optical disc, a learning operation is preferably performed to determine the optical power of the light beam. This learning operation includes a test write processing step and a read signal quality rating processing step. Specifically, first of all, the optical disc is irradiated with a light beam with multiple different recording power settings, thereby recording a number of marks. After that, those recorded marks are scanned with a reading light beam to obtain read signals and then qualities of those read signals are rated by the shape of their signal waveform or their jitter, for example. A recording power setting that will result in a read signal of the highest quality is preferably adopted.

The number of write-prohibited tracks to be interposed between two write-permitted tracks does not always have to be determined by the actual width of the recorded marks but may also be determined by the recording power that has been set through the learning operation described above. If the width of the recorded marks is sufficiently small, then no write-prohibited tracks may be interposed between two write-permitted tracks. Optionally, the system controller 505 may classify the tracks on the optical disc into write-permitted ones and write-prohibited ones irrespective of the recording power setting.

In a preferred embodiment of the present invention, information defining the relations between multiple recording power settings and their associated write-prohibited tracks is collected and then stored in a memory of the optical disc drive. Such information defining the relations between the recording power settings and their associated write-prohibited tracks may be summarized as shown in FIG. 16, in which each recording power setting is associated with the number of write-prohibited tracks to be interposed when a write operation is performed with that recording power setting. Such information may be stored in the form of a table in the nonvolatile memory 506.

Each recording power setting included in that information is one of the multiple recording power settings that are changed either continuously or stepwise in order to irradiate the optical disc 1 with a light beam with different optical powers. It is preferred that this recording power setting be equal to the recording power that is determined during the recording power learning process.

If a table such as the one shown in FIG. 16 is stored in the nonvolatile memory 506, the recording power to use in performing a write operation actually (which will be referred to herein as an "actual recording power") may be selected from the recording power settings that are stored in that table. However, if the actual recording power is different from any of the recording power settings in the table, it is preferred that a recording power setting that is greater than, but closest to, that actual recording power be selected from the table and its associated number of write-prohibited tracks be interposed. For example, if the actual recording power is 2.3 mW, then a recording power setting of 3 mW is preferably selected from the table shown in FIG. 16 and an associated number (i.e., two in this case) of write-prohibited tracks are preferably interposed between two adjacent write-permitted tracks.

Figure 17A:
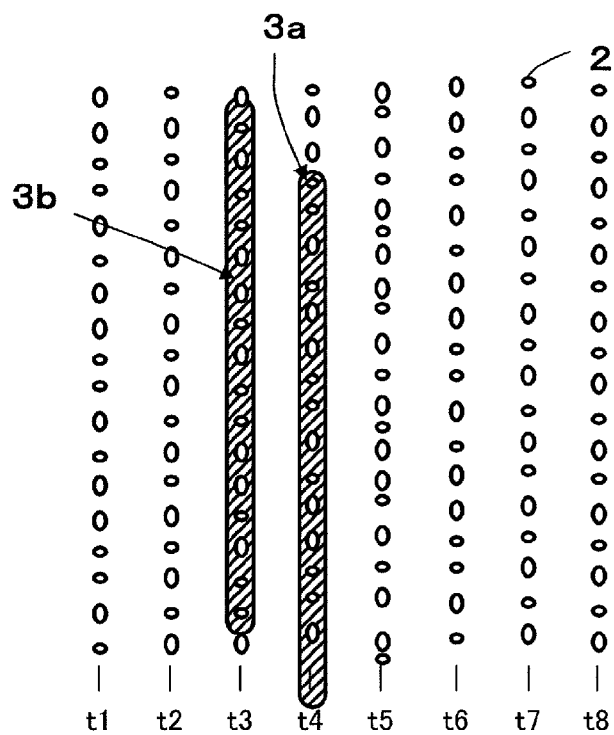
FIG. 17A schematically shows the location of two adjacent marks that were recorded at the recording power of 1 mW with zero write-prohibited track interposed between the marks.

FIG. 17A schematically illustrates two adjacent marks 3 that have been recorded by setting the recording power to be 1 mW and the number of write-prohibited tracks interposed to be zero, respectively. Since the recorded marks 3 have a narrow width in this example, there is no concern about crosstalk or cross-erase even if the recorded marks 3 are adjacent to each other along the radius of the optical disc. That is to say, since crosstalk can be eliminated, no adjacent recorded marks will be scanned by mistake while a target recorded mark is being scanned. And since cross-erase can be eliminated, no adjacent recorded marks will be erased unintentionally while a mark is being recorded.

The relation between the best recording power and the number of write-prohibited tracks to interpose may be defined by any of various methods. For example, the number of write-prohibited tracks to interpose may be determined by scanning the marks 3 that have been recorded with multiple different recording power settings and by sensing how the quality of the read signal (such as its amplitude or jitter) thus generated varies with the number of write-prohibited tracks interposed. Alternatively, the number of write-prohibited tracks to interpose may also be determined by sensing how the error rate varies with the number of write-prohibited tracks interposed while information about the recorded marks is decoded.

Figure 17B:
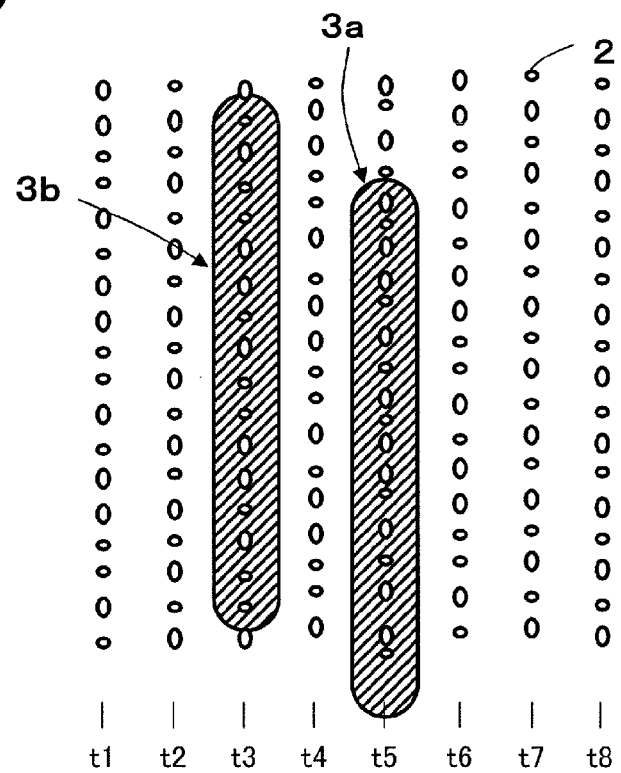
FIG. 17B schematically shows the location of two adjacent marks that were recorded at the recording power of 2 mW with one write-prohibited tracks interposed between the marks.

FIG. 17B schematically illustrates two adjacent marks 3 that have been recorded by setting the recording power to be 2 mW and the number of write-prohibited tracks interposed to be one, respectively. In this example, the recorded marks 3 have had their width somewhat broadened. That is why, if such recorded marks 3 on two adjacent tracks were arranged adjacent to each other along the radius of the optical disc as shown in FIG. 17A, then neither crosstalk nor cross-erase could be reduced sufficiently. For that reason, in this example, when the recording power is set to be 2 mW, one write-prohibited track is interposed between two recorded marks 3 that are adjacent to each other along the radius of the optical disc 1. As a result, the crosstalk and cross-erase can be eliminated, too.

Figure 17C:
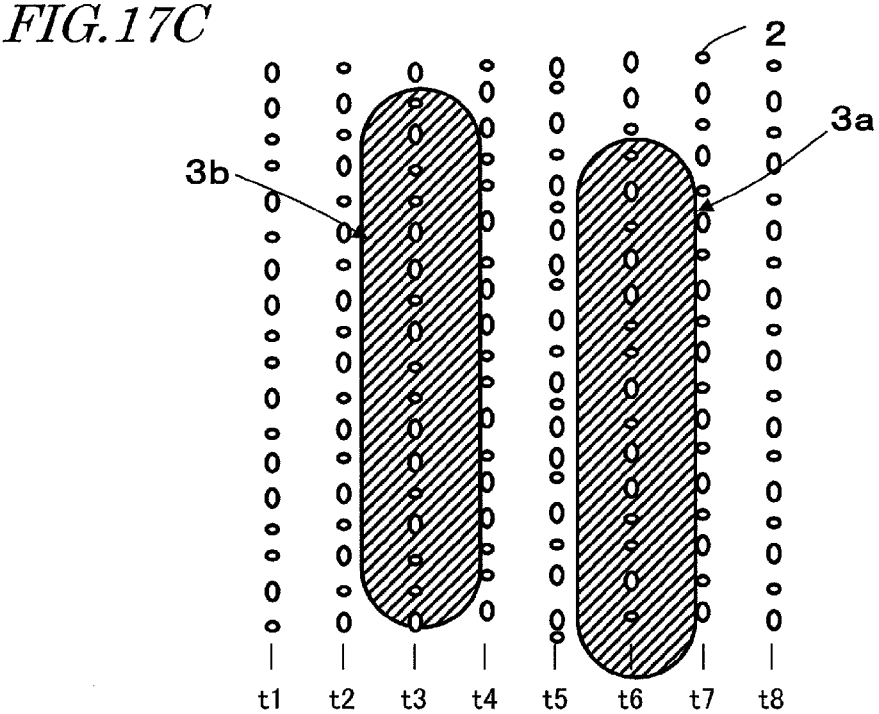
FIG. 17C schematically shows the location of two adjacent marks that were recorded at the recording power of 3 mW with two write-prohibited tracks interposed between the marks.

FIG. 17C schematically illustrates two adjacent marks 3 that have been recorded by setting the recording power to be 3 mW and the number of write-prohibited tracks interposed to be two, respectively. And FIG. 17D schematically illustrates two adjacent marks 3 that have been recorded by setting the recording power to be 4 mW and the number of write-prohibited tracks interposed to be three, respectively.

Figure 17D:
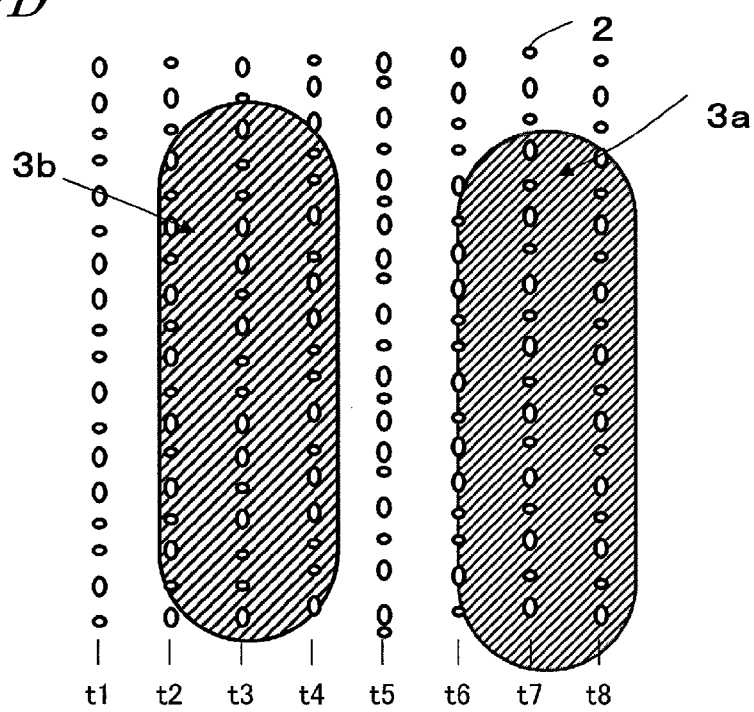
FIG. 17D schematically shows the location of two adjacent marks that were recorded at the recording power of 4 mW with three write-prohibited tracks interposed between the marks.

In the examples illustrated in FIGS. 17C and 17D, each recorded mark 3 covers both of its adjacent write-prohibited tracks at least partially. As no marks 3 are recorded on any of those write-prohibited tracks, the center of a recorded mark 3 is never located on any write-prohibited track. However, now that each recorded mark 3 has a broadened width, the recorded mark 3 may overlap with its adjacent write-prohibited tracks. As used herein, a "write-prohibited track" refers to a track, of which the center should not agree with the center of any recorded mark 3. That is why there is no problem even if such a write-prohibited track is partially covered with a mark 3 that has been recorded on, but has expanded beyond, another track.

Specifically, in the example illustrated in FIG. 17D, the write-permitted tracks are tracks t3 and t7 and the write-prohibited tracks are tracks t4, t5 and t6. The mark 3 that has been recorded on the write-permitted track t3 partially covers the write-prohibited track t4. Even so, it still can be said that there are three write-prohibited tracks between two adjacent recorded marks.

As shown in FIGS. 17A, 17B, 17C and 17D, the higher the recording power setting, the broader the width of the recorded marks 3 gets (as measured along the radius of the optical disc). That is why it is preferred that the number of write-prohibited tracks to be interposed between two write-permitted tracks be determined appropriately according to the degree of broadening of the mark width and information about their relations be stored in the nonvolatile memory 506.

Optionally, the number of write-prohibited tracks to interpose may be fixed if no crosstalk or cross-erase happens between two recorded marks that are adjacent to each other along the radius of the optical disc when the highest one of the recording power settings, which have been defined through recording power learning, and that number of write-prohibited tracks interposed are adopted in combination.

What has just been described with reference to FIGS. 17A, 17B, 17C and 17D agrees with the contents of the exemplary table shown in FIG. 16. However, the relations between the recording power settings and the number of write-prohibited tracks to interpose do not always have to be defined as shown in FIG. 16 and FIGS. 17A through 17D.

Figure 7:
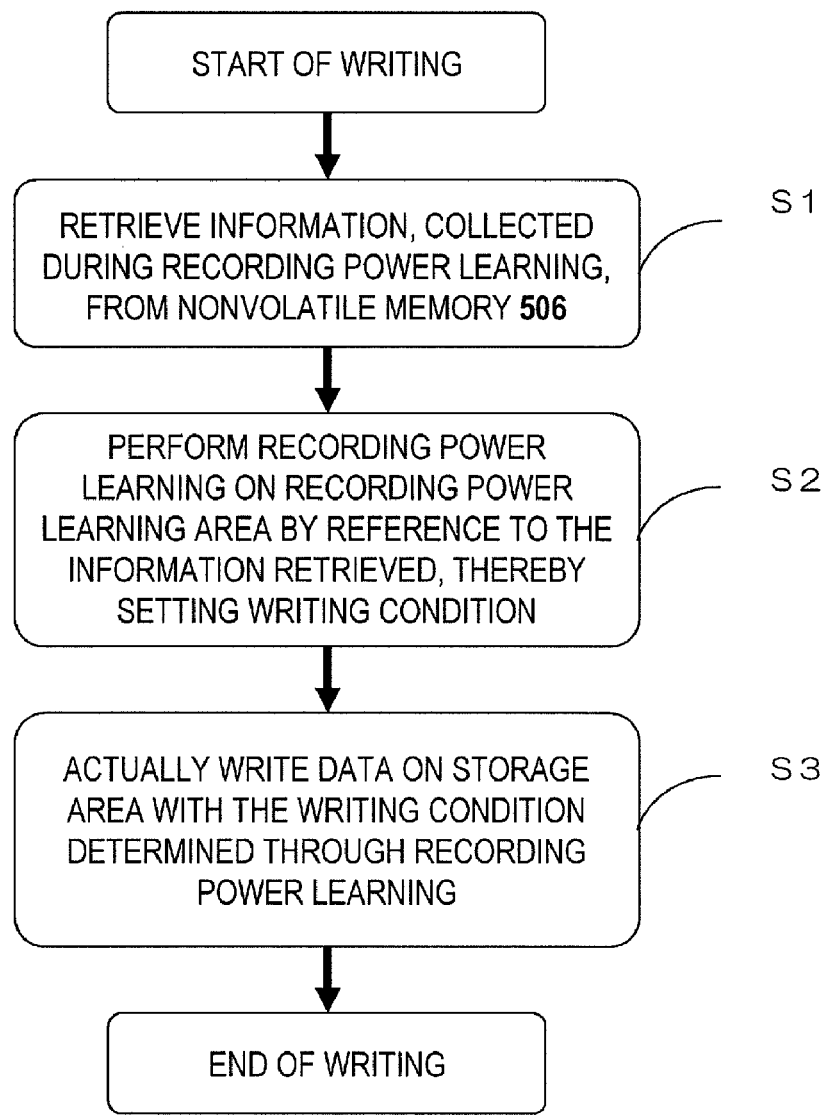
FIG. 7 is a flowchart showing an exemplary procedure of a write-once operation according to the first preferred embodiment.

Hereinafter, an example of a write-once operation will be described with reference to FIG. 7, which is a flowchart showing an exemplary procedure of the write-once operation.

First of all, before the write-once operation is actually carried out, the system controller 505 retrieves in Step S1 information that has been collected during recording power learning from the nonvolatile memory 506. That information collected during the recording power learning includes the information about the number of write-prohibited tracks to be interposed between the write-permitted tracks. An example of that kind of information has already been described with reference to FIG. 16 and it is stored in the form of a table in the nonvolatile memory 506.

Next, in Step S2, the system controller 505 performs recording power learning on a recording power learning area on the optical disc 1 by reference to the information that has been retrieved from the nonvolatile memory 506. As a result of the recording power learning, marks are recorded on two specified tracks with no write-prohibited tracks left between them when the recording power is 1 mW, with one track interposed between them at a recording power of 2 mW, with two tracks interposed there at a power of 3 mW, and with the number of interposed tracks increased to three and four at 4 mW and 5 mW, respectively, as shown in FIG. 16. According to this preferred embodiment, the data that has been written on these five different conditions is read, and then the best one is selected from the five by the signal quality and other parameters. Once the best writing condition has been determined in this manner, its recording power-number of write-prohibited tracks interposed combination is adopted.

The recording power learning area does not have to be fixed on the optical disc. Alternatively, the optical drive may select an arbitrary area from the storage area on the optical disc by reference to the information that has been retrieved from the nonvolatile memory 506 and use that arbitrary area for the purpose of recording power learning.

Optionally, an unrecorded portion may be selected from the recording power learning area on the optical disc while the optical disc is being played, not during the disc loading process, and the recording power learning may be carried out on that selected portion. Such a portion may be specified by the information that was written on, and has just been read out from, the optical disc.

Next, in Step S3, with the writing condition that has been determined in the previous step S2 adopted, data is actually written on the storage area. Just like the recording power learning area, the area to write the data on does not have to be fixed on the optical disc but may be selected arbitrarily by the optical drive by reference to the information retrieved from the nonvolatile memory 506. This write operation may also be performed on an unrecorded portion of the recording power learning area that has been specified while the optical disc is being played.

After having determined the number, locations or arrangement of the write-permitted tracks, the system controller 505 sets the number of revolutions of the spindle motor 503. If the light beam that irradiates the optical disc 1 to record marks 3 thereon had excessively high power, then a part of the substrate 101 shown in FIG. 2 could be thermally deformed and the shape of the pre-pits 2 could also change. That is why the light source power of the optical pickup 501 is preferably set so as to prevent the pre-pits 2 from losing their information.

Once the condition has been set as described above, the system controller 505 controls the optical pickup 501, the spindle motor 503 and other members accordingly. That is to say, the optical pickup 501 starts to record the marks 3.

2.1.2. Control to Perform During Writing

The focus control and the tracking control are carried out so that the light beam emitted from the optical pickup 501 is focused right on the pre-pits 2 on the optical disc 1 and that the light beam spot thereof follows the pre-pits 2 on the target track. In this preferred embodiment, the optical drive 500 performs the focus control by reference to the information about astigmatism that has been obtained based on the light reflected from the optical disc 1. Also, the optical drive 500 performs the tracking control based on the differential phase detection (which will be abbreviated herein as "DPD") information, which can be obtained from the pre-pits 2 and is included in the light reflected from the optical disc 1. A DPD signal is a tracking error signal that can be used effectively to follow a chain of pre-pits 2, which are deep enough to make the RF signal generated have sufficiently large amplitude. If the push-pull method is adopted, the tracking error signal has the largest amplitude when the pre-pits 2 have a depth of $\lambda/8$. However, an RF signal generated from such pre-pits 2 with a depth of $\lambda/8$ will have zero amplitude. On the other hand, an RF signal generated from pre-pits 2 with a depth of $\lambda/4$ will have the maximum amplitude but a push-pull tracking error signal generated from such pre-pits 2 with a depth of $\lambda/4$ will have a zero amplitude this time. For that reason, when a tracking control is performed on the series of pre-pits 2, a DPD tracking error signal is preferred to the push-pull tracking error signal.

If the pre-pits 2 are interposed between (guide) grooves, of which the depth (which may be $\lambda/8$) is different from that of the pre-pits 2 (which may be $\lambda/4$), a push-pull tracking error signal can be generated using those guide grooves. In this preferred embodiment, however, a DPD tracking error signal is used, and therefore, no such grooves are needed.

Hereinafter, it will be described with reference to FIG. 8A how to get the tracking control done while a mark is being recorded. According to this preferred embodiment, pre-pits are located right under a position where a mark 3 is going to be recorded when viewed along a normal to the surface of the optical disc 1. That is why even if a mark 3 needs to be recorded on a track with no guide grooves, the optical drive 500 can also carry out a DPD tracking control using a pre-pit signal included in the light reflected from the optical disc 1. When no marks 3 are recorded, the light beam is emitted with a power that is high enough to produce a DPD signal to get the tracking control done. On the other hand, when marks 3 are recorded, the power of that light beam is temporarily raised. When irradiated with a light beam with such an increased power, the recording film 102 comes to have its optical properties locally changed, thus forming a recorded mark 3 there. According to this preferred embodiment, while a mark 3, which is much longer than a pre-pit 2, is going to be recorded, a single beam with long duration is emitted from the light source continuously, not in multiple pulses with short pulse widths, as described above. Suppose an optical power level that should be reached to record a mark 3 is identified by $P_{high}$ and an optical power level that should be maintained to generate a DPD signal even though no marks 3 need to be recorded is identified by $P_{low}$. In that case, the mark 3 is recorded while the optical power is raised from $P_{low}$ to $P_{high}$. Consequently, the mark 3 thus recorded will have a length that is proportional to the amount of time it has taken to raise the optical power level from $P_{low}$ to $P_{high}$.

According to a technique already known in the art, while a target track on an optical disc 1 is being irradiated with a writing light beam, another track, which is adjacent to the target one, is irradiated with a light beam to produce a tracking error signal (which will be referred to herein as a "sub-beam"). On the other hand, according to this preferred embodiment, even though the optical disc 1 is irradiated with a single beam, a long mark 3 can be recorded right on the target track just as intended while a tracking error signal (DPD signal) is being produced.

In the example illustrated in FIG. 8A, while a mark 3 is being recorded, the light beam has a high optical power level, and therefore, the level of an RF signal representing the intensity of its reflected light is also high as a whole. That high-frequency portion of the RF signal waveform is produced by the pre-pits 2 shown in FIG. 6A, for example. Since a single recorded mark 3 overlaps with multiple pre-pits 2 as shown in FIG. 6A, such a high-frequency signal component representing those multiple pre-pits 2 is included as shown in FIG. 8A in the RF signal, representing the intensity of the reflected light, while the mark 3 is being recorded. It should be noted that the pre-pit signal component is illustrated just schematically in FIG. 8A and that a pre-pit signal with a much higher frequency than the illustrated one will actually be included in an RF signal representing the reflected light.

As shown in FIG. 8A, while a mark 3 is being recorded, the pre-pit signal can be extracted from the RF signal representing the light reflected from the optical disc 1. This is because the recording length of a recorded mark 3 is much longer than that of a pre-pit 2 and also because the intensity of the light emitted from the light source of the optical pickup 501 has been controlled to prevent the light reflected from the pre-pits 2 from getting saturated at the photodetector of the optical pickup 501.

In this manner, the system controller 505 can obtain the signal from the pre-pits 2 while a mark 3 is being recorded. In other words, even while a mark 3 is being recorded, a DPD signal can also be obtained. For that reason, the optical drive 500 can record a mark 3 while performing the DPD tracking control.

On top of that, just before starting a write operation, the system controller 505 can get a PLL locked and generate a clock signal with good stability while reading information from the pre-pits 2 at the same time. A timing signal for recording can be generated by reference to that clock signal. And even while a mark 3 is being recorded, information can still be retrieved from the pre-pits 2 and a clock signal can be generated. As a result, the timing to emit the light beam, of which the power is high enough to record a mark, can be controlled accurately, and therefore, a mark 3 can be recorded with little jitter.

As described above, according to this preferred embodiment, even while a mark 3 is being recorded, the light beam is emitted continuously, not as multiple pulses, and therefore, a tracking error signal and a clock signal can be generated in the meantime. Particularly, since a very long mark 3 needs to be recorded according to this preferred embodiment, it would contribute effectively to recording a mark of quality that a tracking error signal and a clock signal can be generated continuously while the mark is being recorded.

Next, it will be described what advantage will be achieved by performing the DPD tracking control. A normal optical pickup for writing splits the light into three beams on its way toward the disc, and provides three quadruple photodetectors for those three beams, respectively, thereby getting a DPD tracking control done. In this manner, the TE offset, which is produced by the objective lens that follows the rotating optical disc 1 with some eccentricity, can be canceled and the light beam spot can follow the guide grooves of the optical disc with good stability.

On the other hand, according to this preferred embodiment, the DPD tracking control can also be done even during writing, and therefore, only one quadruple photodetector needs to be provided. In other words, since the photodetector has a smaller overall size, the size, and eventually the price, of the optical disc 1 can be cut down as well. On top of that, as there is no need to split the light into three beams, no diffraction grating needs to be provided on the way toward the disc. This will also contribute to reducing the size and price of the optical disc 1. Moreover, since the light is not split into three beams, the light source can be used more efficiently with less power dissipated. Added to that, since the light is not split into three beams, the light source can be used for longer hours, or even a light source that emits light with relatively low power can also be used.

In the preferred embodiment described above, the recording length of a recorded mark 3 is set to be much longer than that of a pre-pit 2. That is why the intensity of the light emitted from the light source needs to be changed much less often than usual in the optical pickup 501. As a result, an inexpensive laser controller can be used.

2.2. Reading Control by System Controller 505

Hereinafter, it will be described with reference to FIGS. 8B through 12 how the system controller 505 performs a reading control on the optical disc 1, on which a mark 3 has already been recorded over pre-pits 2.

Figure 8B:
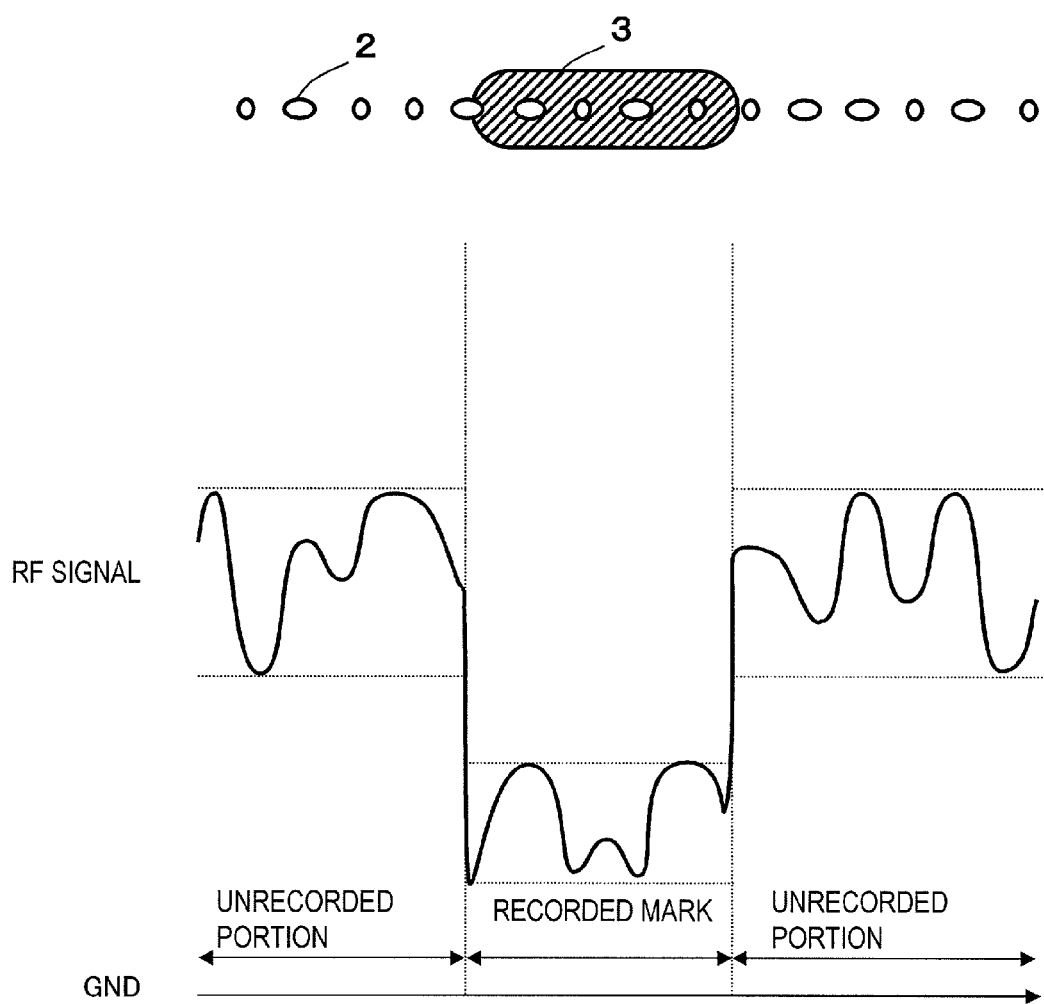
FIG. 8B shows how the waveform of an RF signal changes according to the first preferred embodiment after a mark has been recorded.

FIG. 8B illustrates an exemplary waveform of an RF signal to be obtained from a recorded portion on which a mark of one bit has been recorded and two unrecorded portions that respectively precede and follow that recorded portion. The level of the RF signal obtained from that portion with the recorded mark is lower than that of the RF signal obtained from the unrecorded portions. In FIG. 8A, the light beam has increased power when a mark is recorded. That is why even if the reflectance of the recorded mark is lower than that of the unrecorded portions, the RF signal obtained while the mark is being recorded still has a high level. While data is being read, on the other hand, the optical disc 1 is irradiated with a light beam with a relatively low constant power level. Consequently, the RF signal obtained from a recorded mark with decreased reflectance comes to have a lower level as shown in FIG. 8B. Since there is such a difference in RF signal level between a recorded mark and unrecorded portions, the recorded mark can be detected easily just by sensing that difference.

Figure 9:
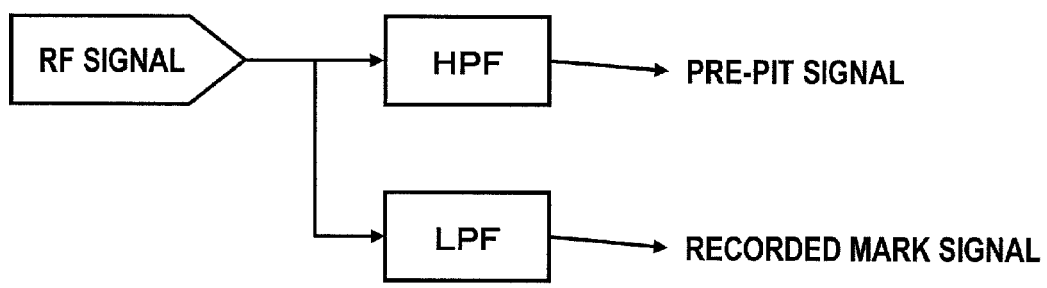
FIG. 9 illustrates an exemplary arrangement according to the first preferred embodiment for splitting an RF signal into a pre-pit signal and a recorded mark signal.

According to this preferred embodiment, the system controller 505 can retrieve information from the optical disc 1, on which a recorded mark 3 is located over pre-pits 2, by controlling the optical pickup 501. More specifically, the system controller 505 can detect both the recorded mark 3 and the pre-pits 2 on the optical disc 1 alike. In other words, the RF signal can be easily split into two different kinds of signals representing the recorded mark 3 and the pre-pits 2 (which will be referred to herein as a "recorded mark signal" and a "pre-pit signal"), respectively, according to their frequencies because the recording length of the recorded mark 3 is much longer than that of the pre-pits 2 and because the recorded mark and pre-pit signals have significantly different frequencies. FIG. 9 illustrates a configuration for a filter circuit that includes a high-pass filter (HPF), which receives the RF signal and selectively passes only the pre-pit signal with the higher frequency with the rest of the RF signal filtered out, and a low-pass filter (LPF), which also receives the same RF signal but selectively passes only the recorded mark signal with the lower frequency. Using a filter circuit such as the one shown in FIG. 9, the system controller 505 can split the RF signal shown in FIG. 8B into the pre-pit signal and the recorded mark signal.

Also, even if a recorded mark 3 is located over pre-pits 2, the system controller 505 can also perform the tracking control using the pre-pit signal. For example, even after the mark 3 has been recorded, an optical signal representing the pre-pits 2 (i.e., high-frequency portions of the waveform) can also be obtained as shown in FIG. 8B. On top of that, a DPD signal can be obtained from the pre-pits 2, too. This is because information has been written as the recorded mark 3 so as not to lose (or erase) the information represented by the pre-pits 2. As described above, since the recorded mark signal and the pre-pit signal fall within two quite different frequency ranges, those two kinds of information can be easily extracted from the reflected light using a filter circuit. It should be noted that if the shortest mark length of the recorded marks 3 is at least ten times as long as the longest pit length of the pre-pits 2, the reflected light can be easily split (i.e., the two kinds of information can be easily extracted), considering the property of the filter circuit.

However, when information represented by the recorded mark 3 needs to be read based on the light reflected from the optical disc 1, it is not always necessary to use the method described above. An alternative method for retrieving information from the recorded mark 3 will now be described with reference to FIGS. 10A and 10B.

Figure 10A:
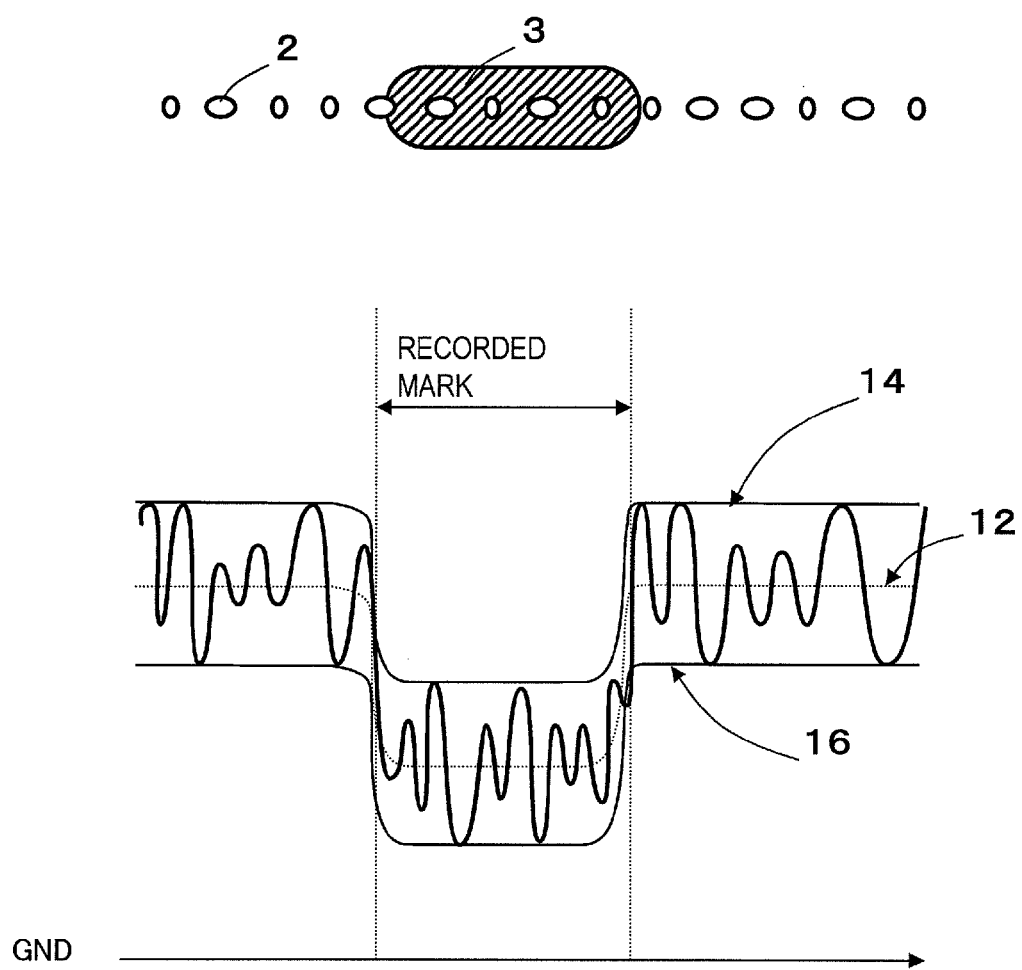
FIG. 10A shows an exemplary waveform of an RF signal according to the first preferred embodiment after a mark has been recorded on the optical disc.
Figure 10B:
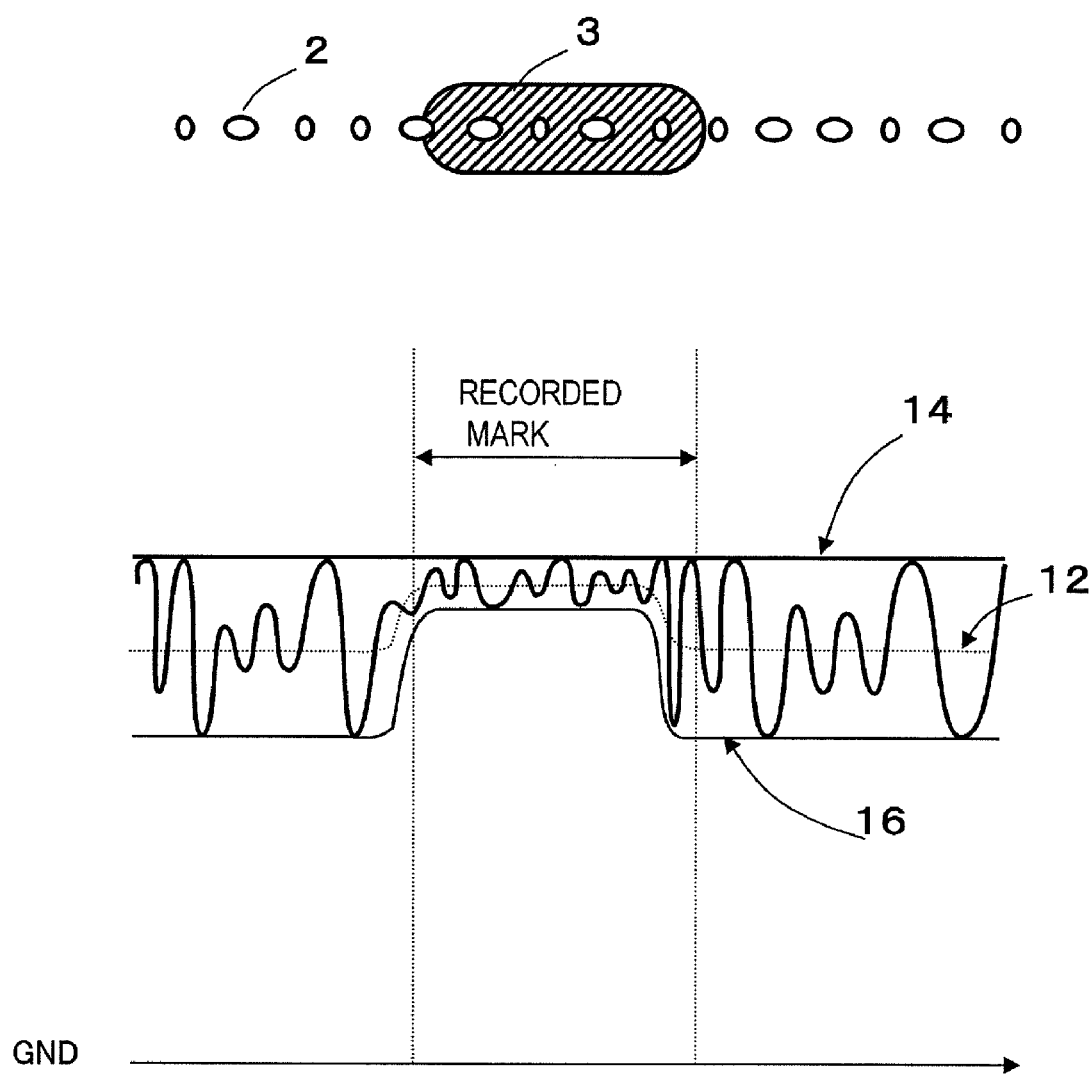
FIG. 10B shows another exemplary waveform of an RF signal according to the first preferred embodiment after a mark has been recorded on the optical disc.

FIG. 10A illustrates an exemplary waveform of an RF signal representing the reflected light, of which the intensity is lower when reflected from a recorded mark than when reflected from an unrecorded portion. On the other hand, FIG. 10B illustrates an exemplary waveform of an RF signal representing the reflected light, of which the average intensity is higher when reflected from a recorded mark than when reflected from an unrecorded portion. In FIGS. 10A and 10B, the abscissa represents the time.

Although the information represented by the recorded mark 3 can be extracted from the RF signal by using the filter circuit shown in FIG. 9 as described above, the information represented by the recorded mark 3 can also be retrieved based on the average 12 and/or the envelope of the RF signal as well. In FIGS. 10A and 10B, shown are a dotted line indicating the average 12 of the RF signal and solid lines indicating the upper and lower envelopes 14 and 16 of the RF signal. In the exemplary waveform shown in FIG. 10A, all of the average 12 and the upper and lower envelopes 14 and 16 of the RF signal are different between the recorded mark and the unrecorded portions. That is why if the average 12 of the RF signal calculated is sensed to drop, then it can be determined that the light beam spot is now passing through a recorded mark 3. Alternatively, it can also be determined, by sensing a drop in the upper or lower envelope 14 or 16 of the RF signal calculated, that the light beam spot is now passing through the recorded mark 3.

On the other hand, in the example illustrated in FIG. 10B, the upper envelope 14 of the RF signal is not different between the recorded mark and the unrecorded portions. Such a waveform may be obtained in a situation where the power of the light beam radiated to record a mark is so low that the optical properties of the recording film have hardly changed but where the pre-pits 2 have been deformed due to the heat. Specifically, such a phenomenon may occur if the pre-pits 2 have been thermally deformed and if their depth has changed from λ/4 and if the intensity of the light reflected from the pre-pits 2 has increased. In the situation illustrated in FIG. 10B, if the average 12 or lower envelope 16 of the RF signal calculated is sensed to rise, then it can be determined that the light beam spot is now passing through the recorded mark 3.

According to the present invention, a mark is not always recorded in a recording film as described above. Even if the optical property (such as the reflectance) of a portion of the recording film in which the mark has been recorded remains unchanged from that of the unrecorded portions thereof, the recorded mark can still be detected by changing the physical condition at the surface of the substrate from that of the unrecorded portions (see FIG. 10B). In other words, according to the present invention, a mark may be recorded either in the recording film or on the surface of the substrate.

It should be noted that the RF signal waveform such as the one shown in FIG. 10B could also be obtained in the following situation, for example. Specifically, even if the overall optical property of the recording film has hardly changed due to a low power level of the light beam that was radiated to record a mark, the heat could still be stored in the dents of the pre-pits 2 and might locally vary the optical property of those portions of the recording film that are located over the dents of the pre-pits 2. In that case, an RF signal such as the one shown in FIG. 10B could also be obtained.

Also, even if a recorded mark 3 is located over pre-pits 2, the system controller 505 can also perform the tracking control using the DPD signal. This is because information has been written as the recorded mark 3 so as not to lose (or erase) the information represented by the pre-pits 2. In the examples illustrated in FIGS. 10A and 10B, even in an area where the mark 3 has been recorded, the information represented by the pre-pits 2 has not been lost but still remains in the RF signal.

Figure 11:
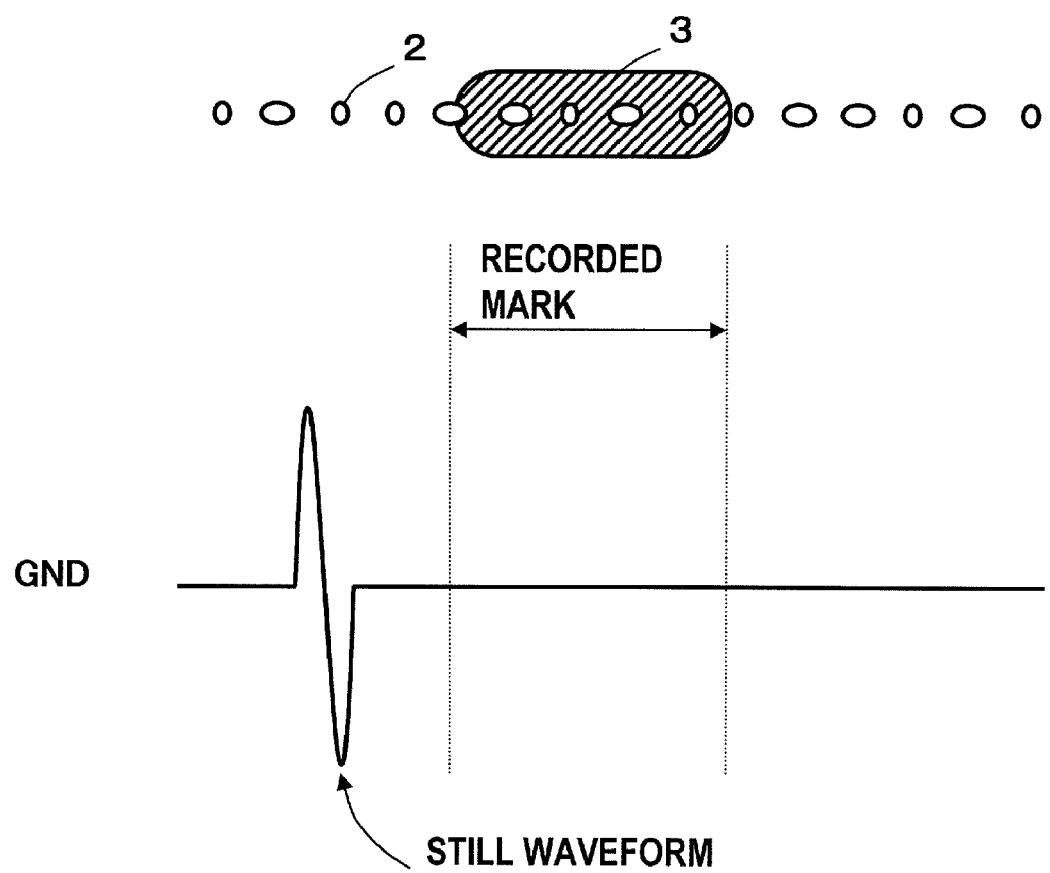
FIG. 11 shows how the waveform of a DPD signal changes while a TE control is being carried out on the optical disc of the first preferred embodiment.
Figure 12:
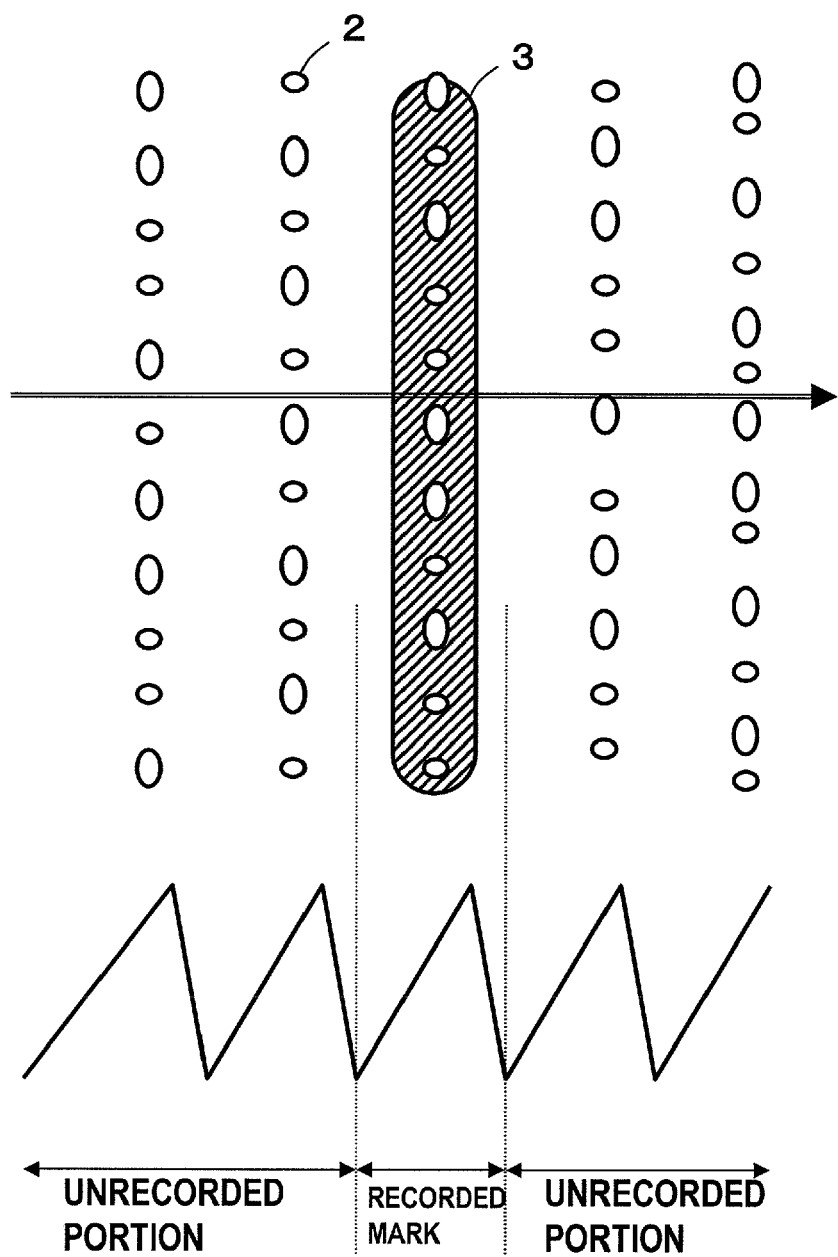
FIG. 12 shows how the waveform of a DPD signal changes when the TE control is not carried out on the optical disc of the first preferred embodiment.

Next, look at FIGS. 11 and 12. FIG. 11 illustrates the waveform of a DPD signal to be obtained from an optical disc after information has been added thereto. In this case, the tracking control is now being carried out so that the DPD signal is maintained at zero level (GND). The waveform shown in FIG. 11 indicates that the TE control is being carried out with good stability both on unrecorded portions and on a portion with the recorded mark.

FIG. 12 also illustrates the waveform of a DPD signal to be obtained from an optical disc after information has been added thereto. In this case, the tracking control is not carried out, and the level of the DPD signal steeply rises or falls every time the light beam spot crosses a track, and has a triangular waveform.

As described above, a DPD signal can be obtained properly no matter whether a mark is being recorded or has already been recorded. If the tracking error signal cannot be obtained from the area where a mark has been recorded, then a sufficiently short mark needs to be recorded there instead and a tracking hold operation may be performed while such a mark is being recorded. However, if a tracking hold operation were performed with respect to a long mark, the tracking control would fail. Since a DPD signal can be obtained according to the present invention even if a recorded mark is located over pre-pits, such a long mark, which would make the tracking control fail when performing a tracking hold operation, can be recorded by carrying out a tracking control using the DPD signal.

Other Embodiments

Figure 13:
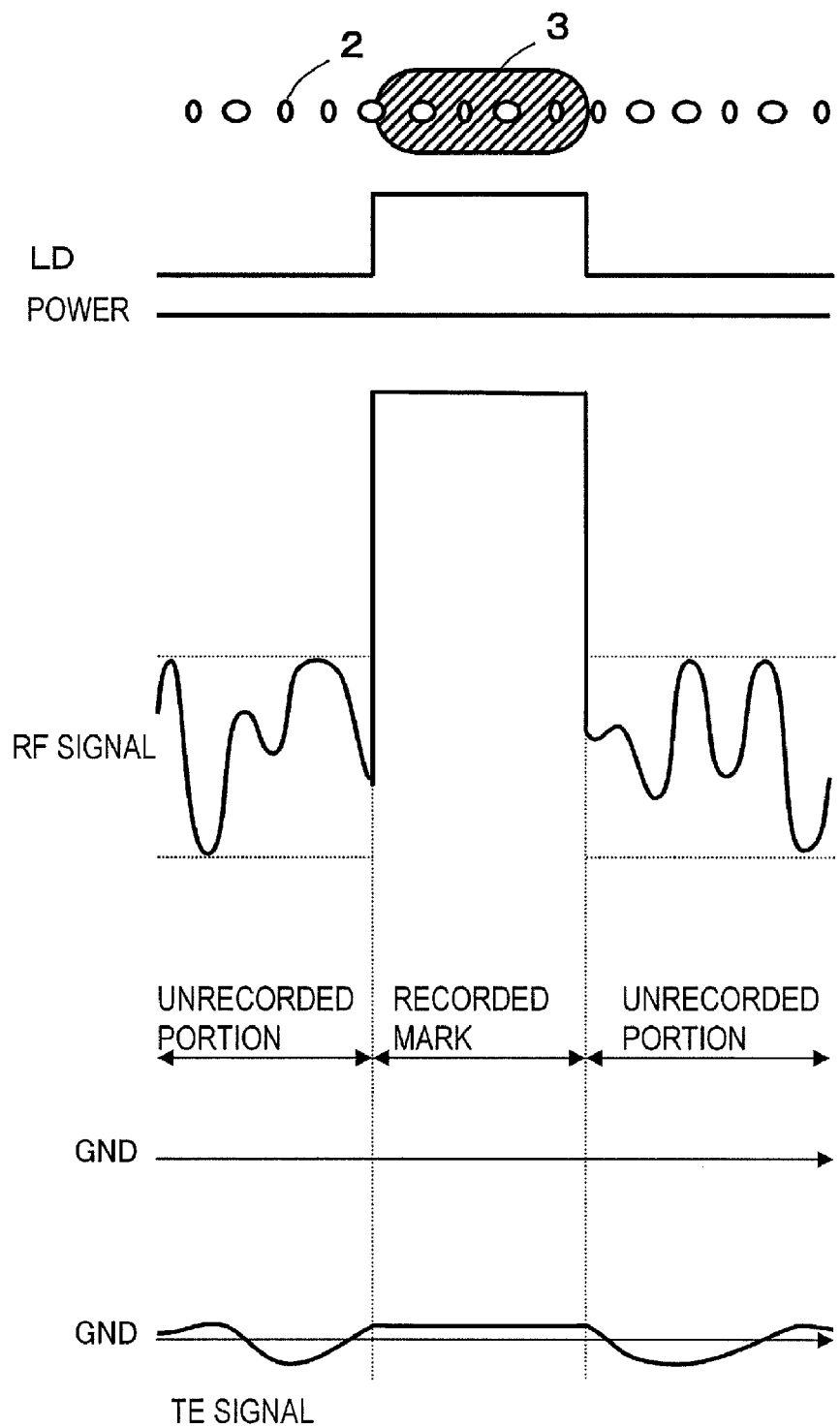
FIG. 13 shows how the waveform of a TE signal changes in another preferred embodiment of the present invention while a mark is being recorded.

Hereinafter, it will be described with reference to FIG. 13 how a tracking hold operation may be performed. FIG. 13 illustrates an exemplary waveform of an RF signal in a situation where while a mark is being recorded, the intensity of the reflected light exceeds the detectible range of the photodetector and gets saturated. As shown in FIG. 13, even if the amplitude of the RF signal is large enough to exceed the detectible range of the photodetector and get saturated during writing, the mark can still be recorded with more stability. Also, according to the power of the light source (i.e., the intensity of the light emitted from the light source), the reflectance of the reflective film could decrease so much as to lower the DPD signal detection accuracy. Then it is difficult to obtain a proper tracking error signal from the area where a mark has been recorded. Even so, it could be effective to carry out the tracking hold operation on such an area where the mark has been recorded.

In the preferred embodiment described above, the DPD tracking control is supposed to be performed while the mark 3 is being recorded. However, this is only an example and the tracking control may also be performed using a push-pull signal while the mark 3 is being recorded. If the frequency range of the read signal obtained from the pre-pits 2 is outside of the signal range of a phase difference detector for use to perform the DPD tracking control (which could happen when the optical disc is rotated at either an excessively low velocity or an overly high velocity), the DPD tracking control could not get done with stability. In that case, the tracking control can be done with more stability by using a push-push signal rather than the DPD signal.

Figure 14:
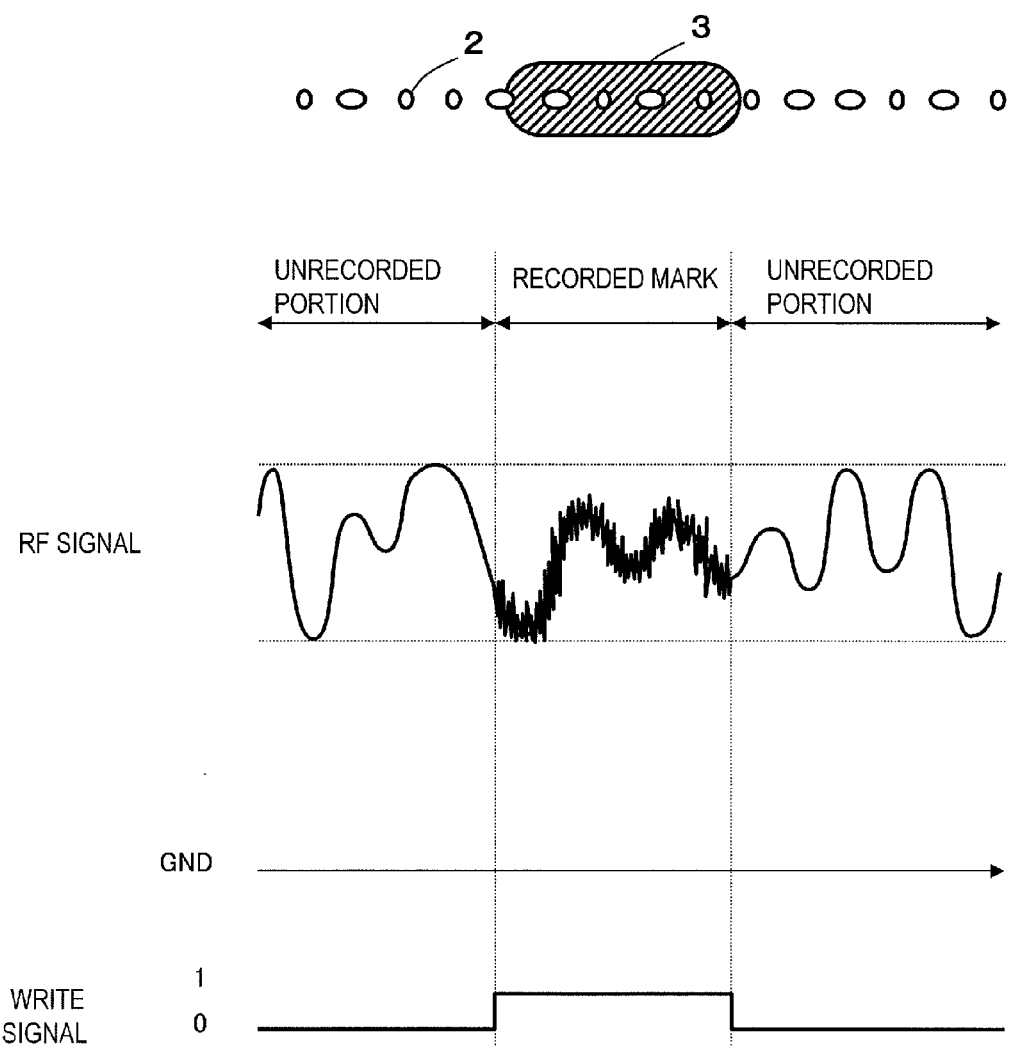
FIG. 14 shows how to locate a recorded mark on a track in another preferred embodiment of the present invention.

Also, in the preferred embodiments described above, the recorded mark 3 is supposed to be detected by the amplitude of an RF signal such as the one shown in FIG. 10A. However, this is only an example, too, and the recorded mark 3 can also be detected by the signal quality (such as the jitter) of the RF signal shown in FIG. 14. According to the present invention, pre-pits are located under every mark recorded 3. That is why even if the amplitude of the RF signal is not different between an area where the mark 3 has been recorded and unrecorded portions, the read signal obtained from the recorded portion with both a recorded mark and pre-pits can have a different jitter from the signal obtained from the unrecorded portions with pre-pits alone. Thus, the recorded mark can also be located by sensing such a difference in jitter between the read signals.

Figure 15:
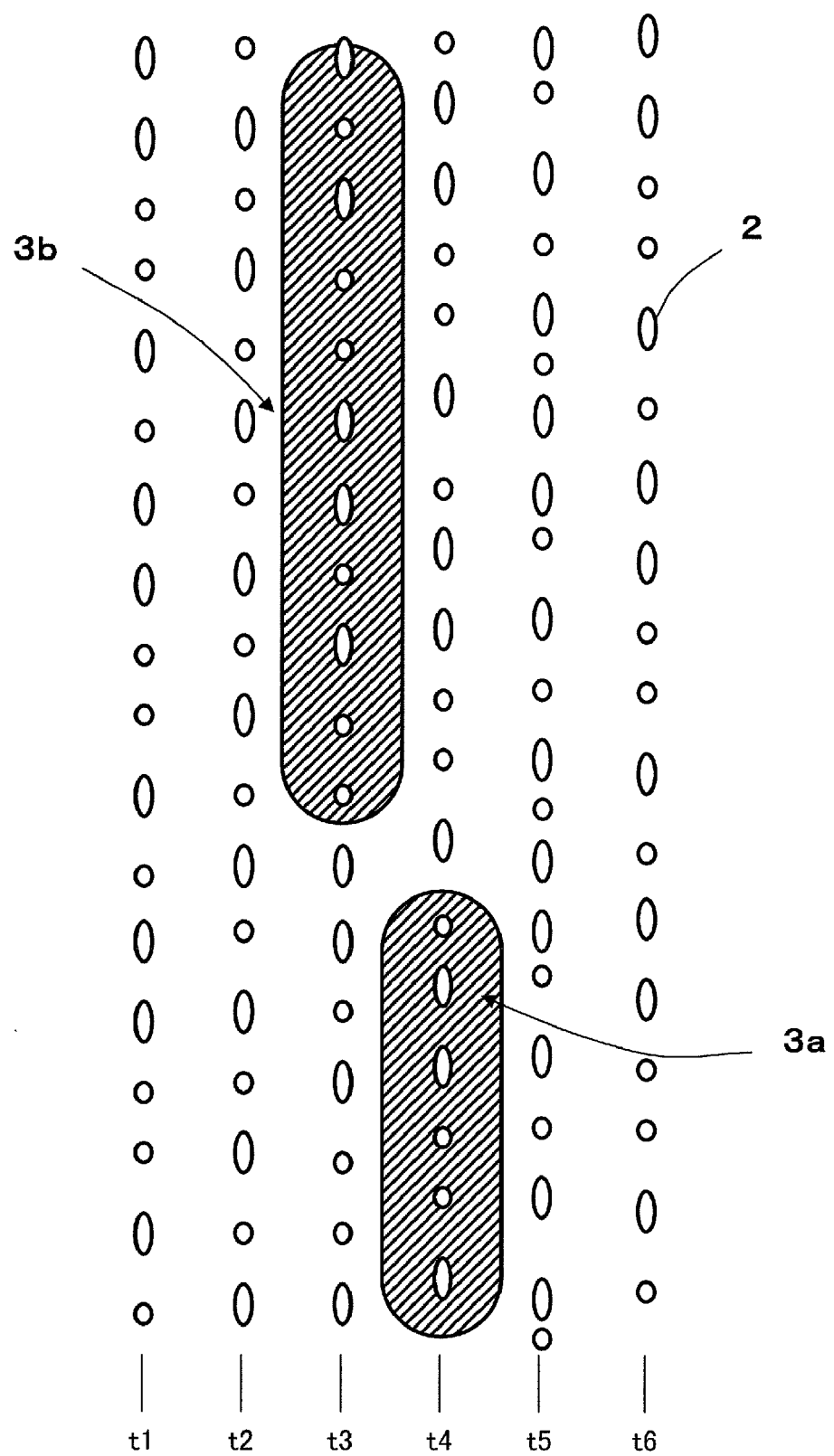
FIG. 15 shows alternative locations of recorded marks on an optical disc according to another preferred embodiment of the present invention.

Furthermore, in the preferred embodiments described above, when multiple marks 3 are recorded, the first and second recorded marks 3a and 3b are supposed to located on non-adjacent tracks as shown in FIG. 6A. However, this is only an example and the recorded marks 3 may also be arranged as shown in FIG. 15 in which the marks 3 are located on two adjacent tracks but are still not adjacent to each other along the radius of the optical disc. Even so, the interval between the respective centerlines of any two recorded marks that are adjacent to each other along the radius of the optical disc is equal to or greater than two track pitches.

If the pre-pits are arranged as "in-pits", the following effects can be achieved. Specifically, those dents of the pre-pits may make the recording film thermally insulating and marks 3 may be recorded more easily. In that case, the power of the light source of the optical pickup 501 can be lowered.

Optionally, the pre-pits may even be no longer readable once marks have been recorded over them. That is to say, any arbitrary arrangement may be used according to this preferred embodiment as long as the marks can be recorded over the pre-pits.

INDUSTRIAL APPLICABILITY

The present invention is applicable for use in an optical drive that can write information on a given optical disc.

REFERENCE SIGNS LIST 1 optical disc
2 pre-pit
3 recorded mark
3a first recorded mark
3b second recorded mark
4 groove
101 substrate
102 recording film
103 protective film
104 hard coating
500 optical drive
501 optical pickup
502 traverse motor
503 spindle motor
505 system controller
506 nonvolatile memory

The invention claimed is:

1. An optical drive for writing information on an optical disc, the disc including a substrate on which a number of pre-pits have been formed on its tracks,
wherein the optical drive comprises
an optical pickup, and
a writing control section that controls the optical pickup so that marks are recorded on the tracks so as to overlap with some of the pre-pits, the writing control section making the optical pickup irradiate the substrate with a writing light beam, and
wherein the writing control section controls the power of the writing light beam to deform shapes of the pre-pits locally by a heat from the writing light beam, thereby forming the marks, and
wherein each said recorded mark is made up of multiple portions of the pre-pits of which the shapes have been locally deformed.

2. The optical drive of claim 1, wherein the optical disc comprises a recording film that is supported on the substrate, and the writing control section controls the power of the writing light beam to deform the shapes of the pre-pits locally by a heat from the writing light beam, thereby changing an optical property of the regions of the recording film that are positioned over the deformed pre-pits.

3. The optical drive of claim 2, wherein the change in the optical property of the regions of the recording film that are positioned over the deformed pre-pits is an increase in an intensity of light reflected from the pre-pits.

4. The optical drive of claim 1, wherein each said recorded mark covers ten or more deformed pre-pits.

* * * * *